(12) United States Patent
Boll

(10) Patent No.: US 12,246,922 B2
(45) Date of Patent: Mar. 11, 2025

(54) WORKPIECE CARRIER

(71) Applicant: GROB-WERKE Gmbh & Co. KG, Mindelheim (DE)

(72) Inventor: Jürgen Boll, Karlsruhe (DE)

(73) Assignee: GROB-WERKE GmbH & Co. KG, Mindelheim (DE)

( * ) Notice: Subject to any disclaimer, the term of this patent is extended or adjusted under 35 U.S.C. 154(b) by 72 days.

(21) Appl. No.: 18/135,862

(22) Filed: Apr. 18, 2023

(65) Prior Publication Data

US 2023/0339688 A1    Oct. 26, 2023

(30) Foreign Application Priority Data

Apr. 25, 2022 (EP) .................................. 22169811
May 23, 2022 (EP) .................................. 22174868

(51) Int. Cl.
  *B65G 17/00* (2006.01)
  *B65G 35/06* (2006.01)
  (Continued)

(52) U.S. Cl.
  CPC ........... *B65G 17/002* (2013.01); *B65G 35/06* (2013.01); *B65G 35/08* (2013.01); *F16B 11/008* (2013.01); *B65G 2201/0217* (2013.01)

(58) Field of Classification Search
  CPC ....... F16B 11/008; B65G 35/08; B65G 35/06; B65G 17/002
  (Continued)

(56) References Cited

U.S. PATENT DOCUMENTS 4,946,021 A * 8/1990 Murphy ................. B23Q 1/525
                                                29/33 P
5,398,802 A * 3/1995 Clopton ............... B65G 17/002
                                                198/465.1
(Continued)

FOREIGN PATENT DOCUMENTS

CN       205169255 U    4/2016
DE       2 209 609 A1    9/1973
(Continued)

OTHER PUBLICATIONS

European Search Report.

*Primary Examiner* — James R Bidwell
(74) *Attorney, Agent, or Firm* — Hoffmann & Baron, LLP

(57) ABSTRACT

A workpiece carrier for transporting a workpiece or a product in a conveyer system having at least one workpiece base provided for accommodating at least one workpiece, the workpiece base including a receiving surface on which a workpiece is mountable and the workpiece base further including a base surface disposed in a distance from the receiving surface. The workpiece carrier further has at least one contact element which, in the operation of the workpiece carrier, is provided to rest on a conveyer element of a conveyer system including a contact surface, the contact element being connected to the base surface of the workpiece base, a first moving direction along which the workpiece carrier is movable in a conveyer system being provided for the workpiece carrier, and a positioning plane being defined which is oriented perpendicular to the contact surface and perpendicular to the first moving direction, the positioning plane intersecting the receiving surface and being disposed in the centre of the length of the workpiece carrier along the first moving direction, and the contact element including at least two apertures which are disposed so that they are offset relative to each other in a direction (Continued)

perpendicular to the contact surface, and the contact element including at least two protrusions which are also disposed so that they are offset relative to each other in a direction perpendicular to the contact surface.

17 Claims, 4 Drawing Sheets

(51) Int. Cl.
  *B65G 35/08*     (2006.01)
  *F16B 11/00*     (2006.01)
(58) Field of Classification Search
  USPC .............................................. 198/795, 465.2
  See application file for complete search history.

(56)     References Cited

U.S. PATENT DOCUMENTS

| | | |
|---|---|---|
| 6,102,194 A | 8/2000 | Charny |
| 7,987,973 B2 * | 8/2011 | Broe ...................... B65G 35/08 198/795 |
| 2007/0029166 A1 | 2/2007 | Lim et al. |

FOREIGN PATENT DOCUMENTS

| | | |
|---|---|---|
| DE | 26 15 598 A1 | 10/1976 |
| DE | 196 30 429 C1 | 2/1998 |

* cited by examiner

Fig. 3
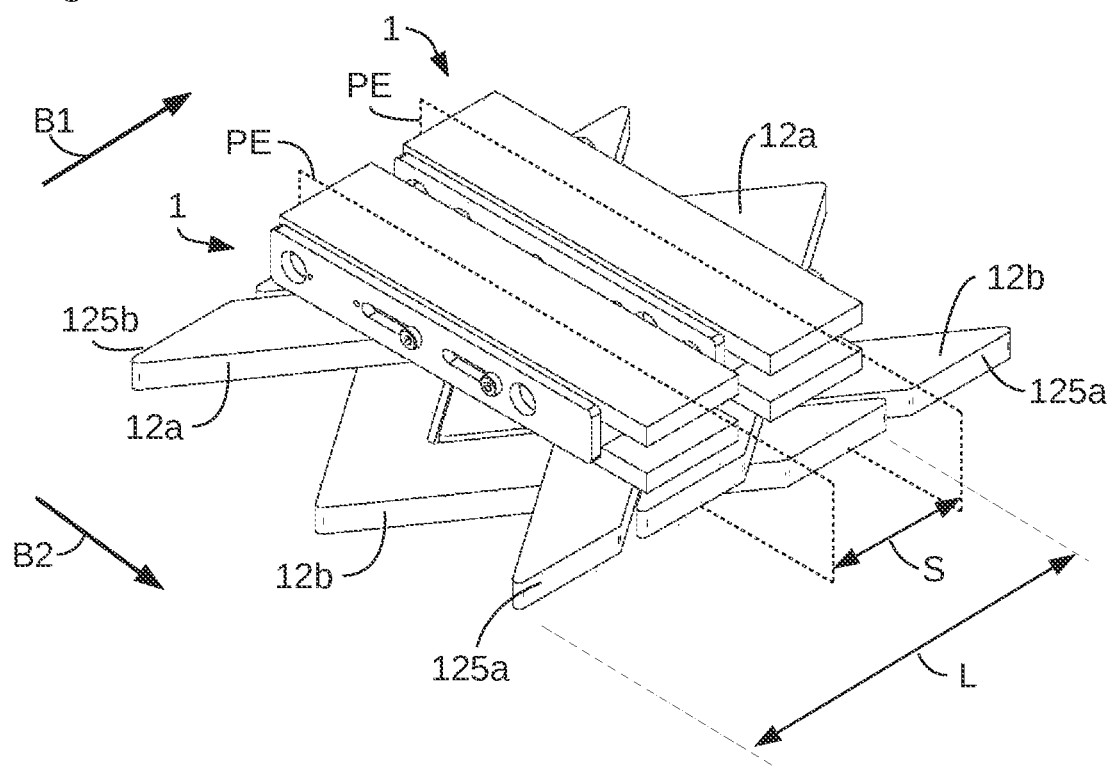
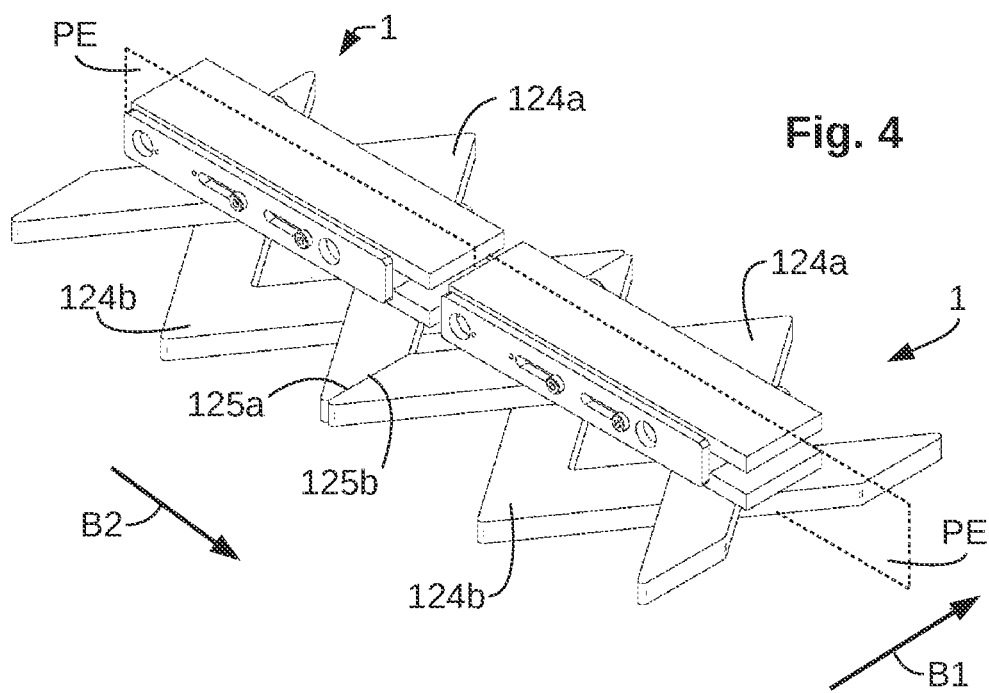
Fig. 4

WORKPIECE CARRIER

BACKGROUND OF THE INVENTION

The invention relates to a workpiece carrier for transporting a workpiece or a product into a conveyer system comprising at least one workpiece base provided for accommodating at least one workpiece, the workpiece base including a receiving surface on which a workpiece is mountable, and the workpiece base further including a base surface disposed in a distance from the receiving surface. The workpiece carrier further comprises at least one contact element which, in the operation of the workpiece carrier, is provided to rest on a conveyer element of a conveyer system having a contact surface, the contact element being connected to the base surface of the workpiece base, a first moving direction along which the workpiece carrier is movable in a conveyer system being provided for the workpiece carrier, and a positioning plane being defined which is oriented perpendicular to the contact surface and perpendicular to the first moving direction, the positioning plane intersecting the receiving surface and being disposed in the centre of the length of the workpiece carrier along the first moving direction, and the contact element having at least two apertures which are disposed so that they are offset relative to each other in a direction perpendicular to the contact surface, and the contact element having at least two protrusions which are also disposed so that they are offset relative to each other in a direction perpendicular to the contact surface. The invention further relates to a conveyer system for transporting workpieces as well as a method for joining a plurality of workpieces using a conveyer system.

In production or logistics, workpiece carriers or load carriers are used to transport workpieces or goods between various stations. Usually, such workpiece carriers are deployed in a conveyer system in larger numbers. For example, workpiece carriers may be used in a conveyer system in which workpieces located on the workpiece carriers are processed or inspected in a plurality of stations. Here, the workpieces may be either remain on the workpiece carriers or be temporarily removed from them and processed in the various stations. Generally, processes requiring as little time as possible for loading and unloading the workpieces are to be preferred in conveyer systems to render a high throughput of the conveyer system possible.

In order to enable a temporary connection between workpiece carriers moved adjacent to each other in the conveyer system, workpiece carriers exist which are designed so that they can, in sections, be pushed into each other. Such workpiece carriers are described, for example, in CN 205169255 U. Each workpiece carrier has a protrusion which can be positively inserted into a correspondingly matching aperture in an adjacent workpiece carrier. When adjacent workpiece carriers are accordingly positioned relative to each other they can therefore be positively connected to form a workpiece carrier assemblage. In the conveyer system, a plurality of interconnected workpiece carriers can be transported together, or the workpieces present thereon may be processed together in a station. Then, the workpiece carriers may again be separated from each other.

Workpiece carriers which can be pushed into each other are also described in U.S. Pat. No. 6,102,194 A. Here, the sections of the workpiece carriers which are insertable into each other are designed so that they cooperate as a brake when a plurality of workpiece carriers accumulate to attenuate the impact of the workpiece carriers on each other.

These known workpiece carriers are tip-resistant since they have a large contact surface on the subsurface, for example, on a conveyer belt. Such resistance to tipping is particularly required during the transport and processing of workpieces having a high centre of gravity. A disadvantage of the known workpiece carriers is that they require a relatively large amount of space when accumulating, i.e., in a state in which workpiece carriers adjacent in the conveying direction contact each other. In this way, only a limited number of workpiece carriers can be temporarily stored in an available storage section. Such temporary storage is important to have a time buffer to remedy malfunctions available in the event of malfunctions in the conveying or production process without having to stop the transport or production. Moreover, there is the problem in the known workpiece carriers that, due to the large contact surface, workpieces dimensioned smaller than the contact surfaces have a large distance to each other during transport or when accumulating which renders joint processing in the assemblage more difficult or impossible.

SUMMARY OF THE INVENTION

It is therefore the object of the invention to propose solutions by means of which workpieces or goods can be transported in a tip-resistant manner while, at the same time, a denser succession of a plurality of workpieces or goods should be possible.

This object is solved by a workpiece carrier for transporting a workpiece or a product in a conveyer system, comprising:
at least one workpiece base provided for accommodating at least one workpiece, the workpiece base including a receiving surface on which a workpiece is mountable, and the workpiece base further including a base surface disposed at a distance from the receiving surface,
at least one contact element which, in the operation of the workpiece carrier, is provided to rest on a conveyer element of a conveyer system having a contact surface, the contact element being connected to the base surface of the workpiece base,
a first moving direction along which the workpiece carrier is movable in a conveyer system being provided for the workpiece carrier, and a positioning plane oriented perpendicular to the contact surface and perpendicular to the first moving direction being defined, the positioning plane intersecting the receiving surface and being disposed in the centre of the length of the workpiece carrier along the first moving direction, and the contact element having at least two apertures which are disposed so that they are offset relative to each other in a direction perpendicular to the contact surface, and the contact element having at least two protrusions which are disposed so that they are offset relative to each other in a direction perpendicular to the contact surface, the protrusion of one workpiece carrier disposed closer to the workpiece base in a direction perpendicular to the contact surface being insertable into the aperture of another workpiece carrier disposed closer to the workpiece base in a direction perpendicular to the contact surface in a direction perpendicular to the positioning plane, and the protrusion of one workpiece carrier disposed closer to the contact surface in a direction perpendicular to the contact surface being insertable into the aperture of another workpiece carrier disposed closer to the contact surface in a direction perpendicular to the contact surface in a direction perpendicular to the positioning plane, each of the apertures, at least in sections, extending on two opposing sides of the positioning plane, particularly through the positioning plane.

The workpiece carrier according to the invention is provided to accommodate at least one workpiece and to transport it through a conveyer system or a production system. The workpiece base of the workpiece carrier is the assembly directly accommodating a workpiece during transport. For this purpose, the workpiece base comprises a receiving surface on which a workpiece can be placed or mounted. A base surface is disposed at a distance from the receiving surface and may be used, for example, for establishing a connection to other assemblies of the workpiece carrier. The receiving surface may have various shapes. In a simple embodiment, the receiving surface is designed to be planar and has a rectangular cross-section in a plan view. However, the receiving surface may also have a more complex shape and may, for example, in sections, have the negative shape of a workpiece to be accommodated. Apart from the workpiece base, the workpiece carrier comprises at least one contact element which constitutes the assembly on which the workpiece carrier rests on a component of a conveyer system in operation. The contact element is connected to the base surface of the workpiece base and rests on a conveyer element of a conveyer system with at least one contact surface in operation. For a more detailed description of the workpiece carrier and of the interaction of a plurality of workpiece carriers, two moving directions as well as a positioning plane are defined which, as an imaginary auxiliary geometry, facilitate the definition of the workpiece carrier. A first moving direction is to be understood to be a moving direction along which the workpiece carrier is preferably moved through a conveyer system in the case in which an insertion of sections of a plurality of workpiece carriers into each other is required or desired. When a plurality of workpiece carriers is moved along the first moving direction a segment of a first workpiece carrier can be inserted into a segment of a second workpiece carrier so that a space-saving accumulation or buffering of a plurality of workpiece carriers is possible. Further, a second moving direction is defined which is oriented perpendicular to the first moving direction. When a plurality of workpiece carriers is transported through a conveyer system along the second moving direction no insertion of adjacent workpiece carriers into each other is possible in the workpiece carrier according to the invention. Therefore, only an accumulation in which adjacent workpiece carriers do not overlap can take place along the second moving direction. Along the second moving direction, fewer workpiece carriers can be temporarily stored on an available buffer segment. However, the larger distance of adjacent workpiece carriers and therefore of adjacent workpieces to each other which is sometimes required for specific processing steps is advantageous in the second moving direction. Further, a positioning plane oriented perpendicular to the contact surface of the workpiece carrier on the conveyer element is defined as an auxiliary geometry. In case of a horizontally oriented conveyer element, the positioning plane is vertically oriented. Moreover, the positioning plane is oriented perpendicular to the first moving direction and intersects the receiving surface. Finally, the positioning plane is located in the centre of the overall length of the workpiece carrier in the direction of the first moving direction and therefore, notionally, divides the workpiece carrier into halves in this direction. In case of a movement of the workpiece carrier along the first moving direction, the distance between two positioning planes of adjacent workpiece carriers oriented parallel to each other is a dimension which may be used for the distance between adjacent workpieces. This dimension may also be referred to as a centre distance and serves as a basis for logistic calculations relating to the throughput and production quantity of a conveyer system. Preferably, a workpiece is disposed on the receiving surface so that it is disposed parallel to the positioning plane and/or that the centre of the workpiece is disposed so that it is congruent to the positioning plane in the first moving direction. However, it is of course also possible to attach a workpiece or even a plurality of workpieces to the receiving surface, these not being disposed parallel to the positioning plane.

The contact element of the workpiece carrier according to the invention comprises two apertures disposed so that they are offset relative to each other in a direction perpendicular to the contact surface. These apertures are provided to accommodate protrusions of an adjacent workpiece carrier when a plurality of workpiece carriers is accumulated. Therefore, the contact element also comprises two protrusions which are offset with respect to each other in a direction perpendicular to the contact surface. Here, the distance between the two apertures is equal to the distance between the two protrusions. Both the apertures and the protrusions may have various shapes, an aperture and a protrusion, however, always being formed so that the protrusion can be inserted into the associated aperture. Each aperture is designed so that it is open on one side in the direction of the first moving direction so that a protrusion of an adjacent workpiece carrier can be inserted from this direction. The two apertures and the two protrusions are disposed on the workpiece carrier so that the protrusion of one workpiece carrier disposed closer to the workpiece base is insertable into the aperture of a second workpiece carrier disposed closer to the workpiece base along the first moving direction or perpendicular to the positioning plane. The same applies to the protrusion disposed closer to the contact surface and the aperture disposed closer to the contact surface: the protrusion of a first workpiece carrier disposed closer to the contact surface is insertable into the aperture of a second workpiece carrier disposed closer to the contact surface. In the event of an accumulation of two adjacent workpiece carriers, therefore, the protrusion of a workpiece carrier disposed closer to the workpiece base enters the aperture of an adjacent workpiece carrier disposed closer to the workpiece base, at the same time, the protrusion disposed closer to the contact surface enters the aperture of an adjacent workpiece carrier disposed closer to the contact surface. In this way, adjacent workpiece carriers overlap in the accumulated state and can be temporarily stored in a space-saving manner, for example in a buffer segment. According to the invention, therefore, respectively one protrusion of a workpiece carrier is insertable into an aperture of another, adjacent workpiece carrier in the first moving direction.

Moreover, however, it may also be possible that such an insertion of respectively one protrusion into an aperture is provided for and geometrically possible in a direction other than the first moving direction. For example, an insertion of respectively one protrusion into an aperture may take place in a direction extending parallel to the contact surface and oriented at an acute angle to the first moving direction. Such an accumulation may also be referred to as an accumulation transverse to the first moving direction. Such a transverse accumulation is advantageous, for example, when the relative moving direction of the workpiece carrier in the conveyer system is to be changed or rotated. Associated examples will be described in connection with optional embodiments of the invention.

According to the invention, both apertures of a workpiece carrier extend, at least in sections, on the two opposite sides of the positioning plane. Along the first moving direction, therefore, the two apertures are longer than half the length of the entire workpiece carrier in this direction. Therefore, each of the apertures extends through the positioning plane disposed in the centre of the receiving surface. Accordingly, the two protrusions are also disposed so that they extend on two opposing sides of the positioning plane along the first moving direction. In this way, each protrusion penetrates an aperture of an adjacent workpiece carrier by more than half the length of each workpiece carrier when adjacent workpiece carriers accumulate. In this way, it is possible to accumulate the workpiece carriers according to the invention along the first moving direction in an extremely space-saving manner. In terms of the contact surface or standing surface, the buffer capacity for a plurality of workpiece carriers according to the invention is significantly increased as compared to known workpiece carriers. Particularly advantageous in the workpiece carrier according to the invention is that, notwithstanding the space-saving accumulation capacity, the length of the workpiece carrier along the first moving direction can be selected to be so large that a high tipping resistance of the workpiece carrier in the conveyer system is achieved. This resistance to tipping, in turn, results in that even a workpiece having a highly located centre of gravity can be stably and safely transported through the conveyer system by a workpiece carrier. For achieving a high resistance to tipping, the length of the contact element along the first moving direction is preferably significantly larger than the length of the receiving surface for accommodating the workpiece. For example, the length of the contact element may be selected so that it is larger than the length of the contact surface by the factor of 2, 3, or 4. Such a large overall length of the workpiece carrier results in that it is extremely tip-resistant, particularly in case of dynamic changes such as accelerations or decelerations in the conveyer system. A workpiece carrier according to the invention is particularly suitable for accommodating slim, plate-shaped workpieces such as, for example, cells of an electric battery. By inserting the protrusions into apertures of an adjacent workpiece carrier, the positioning planes of adjacent workpiece carriers and therefore adjacent workpieces can be brought together very closely so that even joining operations can be performed while the workpieces can remain on their respective workpiece carrier during joining. Altogether, therefore, a workpiece carrier according to the invention facilitates the transport of a workpiece through a conveyer system and renders a buffering of workpieces per surface area possible which is improved as compared to prior art. In this way, the throughput and the reliability of a conveyer system are increased.

In one embodiment, it is contemplated that each of the apertures and each of the protrusions, at least in sections, extend on two opposing sides of the positioning plane so that, when a protrusion of a first workpiece carrier is introduced into an aperture of a second workpiece carrier, the first and the second workpiece carrier can be positioned relative to each other so that the distance between their positioning planes is smaller than half the length of a workpiece carrier in a direction perpendicular to the positioning plane. The distance between two positioning planes of two workpiece carriers disposed adjacent to each other in a conveyer system may also be referred to as the centre distance. Due to the fact that both apertures as well as both protrusions extend on both sides of the positioning plane, they are respectively designed to be longer than half the overall length of the workpiece carrier in the first moving direction. When two workpiece carriers are pushed into each other or accumulate in the first moving direction, therefore, the centre distance between the workpiece carriers is smaller than half the overall length of a workpiece carrier. In this way, the achievable minimum centre distance in relation to the overall length of the workpiece carrier is considerably improved as compared to prior art, and the buffer capacity per available surface area is significantly larger than in prior art. Due to the fact that the two protrusions also extend on both sides the positioning plane, torques generated on the workpiece carrier by the centre of gravity of a workpiece are effectively supported by the workpiece carrier in the first moving direction. The workpiece carrier is therefore extremely tip-resistant and therefore also suitable for transporting workpieces having a high centre of gravity and/or in the event of high dynamic loads such as accelerations and decelerations.

In a further embodiment, it is contemplated that the contact element includes at least two guide members which respectively comprise at least two guide points disposed on the outside of the contact element in a direction perpendicular to the first moving direction, connecting lines between the guide points of the guide members being oriented perpendicular to the positioning plane and spaced apart from each other in a direction parallel to the positioning plane, the guide members, in the operation of the workpiece carrier, being provided to, at least temporarily or in sections, abut on a guide of a conveyer system. In this embodiment, at least two guide members serving to guide the workpiece carrier in a conveyer system are disposed on the contact element. The guide members are disposed on outer sides of the workpiece carrier, these outer sides facing each other at the contact element in a direction perpendicular to the first moving direction. Each guide member comprises at least two guide points which can be connected to each other by an imaginary connecting line. This imaginary connecting line is oriented perpendicular to the positioning plane or parallel to the first moving direction, the imaginary connecting lines extending parallel to each other in a direction perpendicular to the first moving direction and being spaced apart from each other. For example, it is possible that the two guide members together include guide points. However, each guide member may also be formed as an actual geometric line between the two guide points which may be realised by, for example, a curved surface. Furthermore, each guide member may also be formed as a guide surface oriented perpendicular to the contact surface and perpendicular to the positioning plane. When the workpiece carrier is moved through a conveyer system the two guide members, at least in sections and at least temporarily, abut on a guide in the conveyer system. Here, this abutment may take place as a point contact, line contact, or surface contact.

Skilfully, it is contemplated that the receiving surface is oriented parallel to the contact surface. Owing to this parallel orientation, the receiving surface for the workpiece is also oriented parallel to the subsurface on which the workpiece carrier rests. This alignment is particularly convenient for performing specific operations on the workpiece and, at the same time, prevents the workpiece from sliding from the workpiece carrier. Of course, the receiving surface may also be configured so that it is inclined with respect to the contact surface.

In a further embodiment, it is contemplated that the contact element includes a first segment and a second segment which are disposed adjacent to each other and connected to each other in a direction perpendicular to the contact surface, the two segments substantially having an identical shape and size, the two segments being positioned differently relative to the positioning plane. In this embodiment, the contact element is implemented in at least two parts. Here, the two segments are disposed adjacent to each other and connected to each other. Here, adjacent means that the two segments do not have to directly adjoin each other. It is also possible that an intermediate element, for example one or a plurality of spacer discs, is disposed between the segments. The two segments have substantially the same shape but are oriented differently relative to the positioning plane. For example, the two segments may be disposed so that they are mutually mirrored with respect to the positioning plane.

Moreover, it is contemplated that the first segment is connected to the workpiece base and that the second segment is connected to the first segment on its side located opposite of the workpiece base, the contact surface being disposed on the second segment on its side located opposite of the first segment. The elements or components second segment, first segment and workpiece base are disposed one above the other in a direction perpendicular to the contact surface. Here, also other components such as, for example, spacer discs may be disposed between these elements or components. The contact surface attached to the second segment is located at the very bottom in the application. Above it, the first segment is mounted, and at the very top, above the first segment, the workpiece base is disposed.

Skilfully, it is contemplated that at least one of the guide members is disposed on the first segment, and that at least one of the guide members is disposed on the second segment. The guide members are disposed opposite of each other on the outer sides of the contact element in a direction parallel to the positioning plane. In an embodiment including a first and a second segment, at least one of the guide members is disposed on the first segment, and at least one other guide member is disposed on the second segment. It is also possible that at least two guide members are disposed on each of the two segments. In this way, at least two guide members spaced apart from each other in a direction perpendicular to the positioning plane are disposed on each outer side of the contact element. This embodiment including at least four guide members is particularly favourable since it quite effectively prevents an undesired rotation of the workpiece carrier in a conveyer system and thereby ensures a stable orientation of the workpiece carrier along the guide direction.

In one embodiment, it is contemplated that a first aperture and a first protrusion are disposed on or in the first segment, and that a second aperture and a second protrusion are disposed on or in the second segment. In this embodiment, respectively one aperture and respectively one protrusion are disposed on each of the two segments. In this way, a guided pushing of two adjacent workpiece carriers into each other is possible particularly well in the first moving direction.

Advantageously, it is contemplated that each segment includes respectively one guide member oriented perpendicular to the positioning plane on opposite ends in the direction of the positioning plane. In this embodiment, respectively one guide member implemented as a guide surface is disposed on the outer sides of each of the two segments. This results in an extremely stable guidance of the workpiece carrier in a conveyer system. The guide surfaces which are oriented perpendicular to the positioning plane may also be replaced by guide lines which are also oriented perpendicular to the positioning plane.

Optionally, it is contemplated that the contact element is designed so that it is as long as or longer than the workpiece holder in the direction of the positioning plane. In this embodiment, the contact element protrudes beyond the workpiece holder on one, preferably on two sides in the direction of the positioning plane. This results in a particularly good tipping resistance of the workpiece carrier in a direction parallel to the positioning plane. Alternatively, however, the contact element and the workpiece holder may also be designed so that they are equally long in a direction parallel to the positioning plane. Moreover, it is possible that the workpiece holder is designed so that it is longer than the contact element in this direction.

In an advantageous implementation, it is contemplated that, in a plan view of the contact surface, the outer contour of each segment on a first side substantially corresponds to the outer contour of the segment on a second side located opposite of the first side, the first side being located opposite of the second side in a direction perpendicular to the positioning plane. In this embodiment, mutually opposite sides of each segment have the same shape. Due to this design, a segment of a first workpiece carrier can be slid into a segment of a second workpiece carrier in a particularly easy manner. For example, the outer contours of each segment on a first side and on a second side which are located opposite of each other in a direction perpendicular to the positioning plane may be formed as semicircles. When two segments of adjacent workpiece carriers are pushed into each other a semicircle-shaped outer contour will then abut on a semi-circular outer contour of another workpiece carrier formed in a corresponding complementary shape. In this way, a plurality of workpiece carriers can be inserted into each other in a particularly space-saving manner.

It is further contemplated that, in a perpendicular plan view of the contact surface, the contact element is formed so that it is symmetrical to the positioning plane. In this embodiment, in a plan view, the positioning plane constitutes a central plane or symmetry plane of the workpiece carrier. At the same time, however, the two segments are offset with respect to each other in a direction perpendicular to the contact surface, i.e., parallel to the positioning plane. The symmetry about the positioning plane is therefore given in a two-dimensional projection of the workpiece carrier, not, however, in three-dimensional space. In this embodiment, the positioning plane is located in the centre of each individual one of the two segments disposed one above the other in the first moving direction. Due to this shape symmetrical in a projection about the positioning plane which is, at the same time, formed by two segments disposed one above the other in a direction perpendicular to the contact surface, it is rendered possible that respectively two apertures and protrusions having the same shape are disposed on each segment. In the event of an accumulation or pooling of two workpiece carriers in the first moving direction, thus, a protrusion of the first workpiece carrier will enter an aperture of the second workpiece carrier, and a protrusion of the second workpiece carrier will enter an aperture of the first workpiece carrier. In this way, the segments of the adjacent workpiece carriers overlap along a large length in the first moving direction rendering a space-saving accumulation of a plurality of workpiece carriers possible.

In a further embodiment, it is contemplated that, in a plan view of the contact surface, each segment is formed so that it is axially symmetric to an axis oriented perpendicular to the positioning plane. In this embodiment, each segment is formed so that it is symmetric in a direction parallel to the positioning plane, i.e., about an axis standing perpendicular to the positioning plane. Owing to this symmetry, a plurality of workpiece carriers can also be accumulated or linked to each other particularly well along a second moving direction oriented perpendicular to the first moving direction. Preferably, the symmetry axis is located at the centre of the length of the contact element in a direction parallel to the positioning plane here. Of course, also a combination of a plurality of the embodiments described above is possible. For example, the contact element may be implemented so that it is symmetric to the positioning plane in a plan view of the contact surface, and, at the same time, the two segments may respectively be designed so that they are axially symmetric about an axis standing perpendicular to the positioning plane.

In a further embodiment, it is contemplated that, in a plan view of the contact surface, each segment is formed in a V-shape, the two arms of the V particularly being disposed at an angle of 5° to 150° with respect to each other, the free ends of the V respectively including a guide member on their front sides, the guide members of the segments disposed adjacent to each other one above the other being flush with each other on each end of the contact element. In this embodiment, each of the two segments is formed in a V-shape, the two Vs being disposed symmetric to the positioning plane in a plan view. The angle between the two arms of each segment formed in a V-shape may be 5° to 150° here. Preferably, the angles between the two arms are identical in both segments. On the front sides disposed on the outer side which may also be referred to as free ends, respectively one guide member is disposed here. As free ends, the ends of the segments located opposite of the ends of the arms interconnected to form a V are referred to. In order to ensure a good guidance in a conveyer system, the guide members of the first segment disposed on the front sides are flush with the guide members on the front sides of the second segment here. Preferably, the two segments formed in a V-shape are oriented in opposite directions relative to each other; this means that the tip of the one V points in the direction opposite to the tip of the second V in the direction of the first moving direction.

In an advantageous implementation, it is contemplated that, in a plan view of the contact surface, each segment is, at least in sections, formed in a V-shape, an aperture being disposed between the arms of the V, and a protrusion being formed by the convex outer side of the tip of the V, each segment being formed in a V-shape in a plan view of the contact surface, the tips of the V of the two segments interconnecting its two arms being disposed on opposite sides of the positioning plane, and the two segments being disposed so that they are symmetric with respect to each other about the positioning plane in a plan view. In this embodiment, a plurality of the embodiments described individually above are combined with each other. The contact element is formed of two V-shaped segments disposed one above the other and disposed so that they are symmetric to the positioning plane in a plan view. This means that, in a plan view, a projection of the entire contact element is formed so that it is symmetric relative to the positioning plane. The two apertures are respectively formed by the area between two arms of a segment. The two protrusions are respectively formed by the convex outer contour of a segment formed in a V-shape. Here, the convex tip of one of the two segments is disposed on a first side of the positioning plane, and the convex tip of the second one of the two segments is disposed on the opposite side of the positioning plane. This embodiment renders an extensive insertion of a plurality of adjacent workpiece carriers into each other in the first moving direction and thus their space-saving accumulation possible. At the same time, the contact surface of the contact element disposed on the lower side of the second segment extends on both sides of the positioning plane by a large length. Torques transmitted to the workpiece carrier by a workpiece can be supported particularly well in this way. In this way, a high tipping resistance of the workpiece carrier is ensured in the first moving direction. This embodiment therefore effectively combines the possibility of being capable of accumulating or lining up a plurality of workpiece carriers very tightly with a high tipping resistance of each individual workpiece carrier.

In a further embodiment, it is contemplated that, in a plan view of contact surface, each segment is, at least in sections, formed in a V-shape, the outer surfaces of the segments on two sides located opposite of each other perpendicular to the positioning plane being, at least in sections, designed to be planar, the two arms of the V respectively being oriented at an angle of 1° to 89°, preferably at the same angle, to the positioning plane. In this embodiment, the outer surfaces of the two segments formed in a V-shape are designed to be planar and extend in a straight line in a plan view. Here, both outer contours located opposite of each other in a direction perpendicular to the positioning plane are designed to be planar. The arms as well as the areas of their outer surfaces designed to be planar are preferably oriented at an angle of 1° to 89° to the positioning plane. Angles of 30° to 50° have been found to be particularly favourable here. Owing to the planar outer surfaces of the arms oriented at an angle to the positioning plane it is possible that a plurality of workpiece carriers are inserted into each other or accumulated in a direction transverse to first moving direction and to the second moving direction. Here, transverse is to be understood to mean that this direction extends in the same plane as the first moving direction and the second moving direction but is oriented at an angle to these moving directions which is different from 0° and 90°. In case of such a transverse insertion into each other, the planar outer surfaces of a workpiece carrier slide along the planar outer surfaces of another workpiece carrier. In this way, a movement in a transverse insertion direction is translated into a movement in the first moving direction by the workpiece carrier. In this embodiment, also the moving direction of workpiece carriers may be readily changed by a conveyer system. For example, a relocation may be performed during which the workpiece carriers first move along the first moving direction and, after the relocation, move along the second moving direction. For example, in a conveyer system, first an accumulation of a plurality of workpiece carriers along the moving direction may take place. Starting from this accumulated state, the workpiece carriers will then be separated or diverted by a moving baffle disposed at an angle to the first moving direction. During this separation, the planar outer surfaces of adjacent workpiece carriers slide along each other. After the separation, the workpiece carriers are moved further by a conveyer element the moving direction of which is directed in the second moving direction. It is therefore possible to vary the moving direction of the workpiece carriers in the conveyer system by providing a simple, movable baffle.

In a further embodiment, it is contemplated that a spacer element is provided which is movably connected to the workpiece holder, the spacer element being laterally disposed on the workpiece holder between the receiving surface and the first segment of the contact element, and the spacer element including at least one aperture which is incorporated in its side located opposite of the workpiece holder and which extends in a direction perpendicular to the positioning plane and parallel to the receiving surface, and that at least one stopper is provided which extends in a direction perpendicular to the positioning plane and parallel to the receiving surface, the stopper being fixed to the side of the workpiece holder located opposite of the spacer element in a direction perpendicular to the positioning plane, and the stopper having, at least in sections, a size and shape which fits into the aperture of the spacer element, the aperture being located opposite of and flush with the stopper in a direction perpendicular to the positioning plane in a first position of the spacer element relative to the workpiece holder, and the aperture not being located opposite of and not being flush with the stopper in a direction perpendicular to the positioning plane in a second position of the spacer element relative to the workpiece holder. In this embodiment, the workpiece carrier comprises a spacer element which is provided to adjust the distance between two workpiece carriers which are inserted into each other and adjacent to each other in the first moving direction. The distance between two positioning planes of adjacent workpiece carriers can be adjusted by the spacer element. This distance of two adjacent positioning planes may also be referred to as the centre distance. The spacer element is movably, particularly slidably disposed on the outside of workpiece holder. The spacer element is accordingly fixed to and supported on the workpiece holder. The spacer element includes at least one aperture provided to interact with a stopper of an adjacent workpiece carrier. Due to the slidability of the spacer element, it is possible to insert the stopper of an adjacent workpiece carrier into the aperture of the spacer element in one position of the spacer element. In another, shifted position of the spacer element, however, this is not possible since the aperture of one workpiece carrier is not flush with the stopper of an adjacent workpiece carrier. In this case, the stopper of a workpiece carrier abuts on the surface of the spacer element facing away from the workpiece holder. The various positions of the spacer element therefore result in different centre distances between two adjacent, accumulated workpiece carriers. Along the first moving direction, the spacer element and the protrusion of a workpiece carrier are located opposite of each other at the workpiece holder. It is also possible that the spacer element includes two or more apertures and that, accordingly, two or more stoppers are disposed on the opposite side of the workpiece holder. With at least two combinations of apertures and stoppers, an improved guidance or alignment of adjacent workpiece carriers in the accumulated state is achieved. The aperture and the stopper are formed in a mutually complementary shape so that the stopper can be introduced into an aperture. The shapes of the stopper and the aperture as seen in a direction parallel to the first moving direction may be different here. For example, this shape may be circular or implemented as a polygon.

In one embodiment, it is contemplated that the workpiece base has the shape of a cuboid, the spacer element either having an overall length which is larger than the overall length of the workpiece holder in a direction parallel to the positioning plane so that the spacer element protrudes beyond the workpiece base in a direction parallel to the positioning plane, or a cavity which extends through the workpiece base in a direction perpendicular to the positioning plane and is open in the direction of the positioning plane on the front side of the workpiece base formed as a cuboid being disposed on at least one end in the direction of the positioning plane, and the spacer element being inserted into or overlapping at least one cavity disposed on a front side of the workpiece holder in a view from the first moving direction, the spacer element being shiftable in its position relative to the workpiece holder by inserting an object, particularly a blade of a conveyer system, into the cavity. In this embodiment, the spacer element is designed so that its position relative to the workpiece holder can be automatically adjusted during the transport of the workpiece carrier in a conveyer system. This adjustment is rendered possible by the spacer element being capable of being contacted and shifted by an object from the outside of the workpiece carrier. For example, such an object may be a blade which is to be understood to be a system element which can be advanced in a conveyer system and, in the advanced state, reaches a workpiece carrier which is moved on a conveyer element. To be capable of readily reaching and shifting the spacer element by means of an object the spacer element may protrude beyond the workpiece holder in a direction parallel to the positioning plane. On this protruding area of the spacer element, then, an object may engage from the outside, the spacer element being shifted in its position relative to the workpiece base by this engagement. In order to ensure that the spacer element protrudes beyond the workpiece holder it is designed to be longer than the overall length of the workpiece holder parallel to the positioning plane. Alternatively, in a case in which the spacer element is not longer than the overall length of the workpiece holder, a cavity provided as a recess for inserting or passing through an object such as, for example, a blade may be provided in the workpiece base. Such a cavity extends through a front side of the workpiece base in a direction perpendicular to the positioning plane. The cavity is disposed so relative to spacer element that it is inserted into or overlaps the cavity as regarded from the first moving direction. When an object is inserted into the cavity this indented side of the spacer element is therefore contacted so that it is shifted in its position. Preferably, two cavities of the workpiece base located opposite of each other in a direction parallel to the positioning plane are incorporated.

In an alternative embodiment, it is contemplated that the spacer element comprises a spacer and an adjusting mechanism, the adjusting mechanism being disposed between the spacer and the workpiece holder, the position of the spacer relative to the workpiece holder being adjustable, particularly continuously adjustable, in a direction perpendicular to the positioning plane and parallel to the contact surface by operating the adjusting mechanism. In this embodiment, the spacer element comprises an adjusting mechanism which moves a spacer relative to the workpiece holder. The adjusting mechanism may have various designs here. For example, the adjusting mechanism may be implemented as a magnetic switch or as a servo motor. Moreover, an electronic control may be provided which operates the adjusting mechanism, for example, by means of radio-control. In this way, the spacer can be moved relative to the workpiece holder without the necessity to advance an object from the outside, for example a blade. Preferably, the spacer comprises a planar outer surface without apertures and is continuously adjustable in its distance to the workpiece holder. In this way, it is possible to individually and continuously adjust the centre distance between two accumulated workpiece carriers.

The object of the invention is further solved by a conveyer system for transporting workpieces and/or goods comprising:

a conveyer element which is provided to move a plurality of workpiece carriers through the conveyer system, and the conveyer element being drivable by a drive, a guide which confines the conveyer element on two opposite sides and which is provided to guide the workpiece carriers moved by the conveyer element, the guide determining a guide direction at any location of the conveyer element, at least two workpiece carriers according to one of the embodiments described above, the contact surface of each workpiece carrier resting on the conveyer element, and at least one guide surface or at least a segment of a protrusion, at least temporarily, abutting on the guide.

The conveyer system according to the invention comprises at least two workpiece carriers according to the invention according to one of the embodiments described above. The conveyer system further comprises a plurality of components or elements of known conveyer systems. This includes a conveyer element provided to transport the workpiece carriers through the conveyer system. The conveyer element may be implemented as, for example, a conveyer belt. Of course, also a plurality of conveyer elements may be provided which are, for example, moved in various directions within the conveyer system. The conveyer system further comprises a guide which is disposed above the conveyer element and confines it on two opposite sides. The guide may be implemented as a rail and confines the path on which the workpiece carriers are to move through the conveyer system. The guide extends substantially along the entire length of the conveyer element or the conveyer elements. The guide determines a guide direction at any location along the supply volume. Here, the guide direction is to be understood to be the direction of a tangent to the guide. The guide direction changes, at least in sections, along the length of the guide or of the conveyer element. The workpiece carriers rest on the conveyer element with their contact surface and are moved by it in the conveyer system. The guide of the conveyer system guides the workpiece carriers on their path through the conveyer system. To this end, at least one of the guide members of the workpiece carrier or at least a segment of a protrusion of the workpiece carrier, at least temporarily, abuts on the guide. Here, temporarily is to be understood to mean that this abutment does not necessarily need to prevail during the entire transport of the workpiece carrier through the conveyer system. Rather, the guide member or the protrusion abuts on the guide particularly in areas of the redirection or change of the moving direction. However, it is also possible that, particularly in areas of the conveyer element and the guide extending in a straight line, there is no continuous contact between guide member or protrusion and the guide. A segment of a protrusion may be understood to be various segments. For example, in embodiments including segments designed in a V-shape forming protrusions with their convex outer sides, the tips of these Vs may temporarily abut on the guide. However, it is also possible that outer surfaces of the arms of the V temporarily abut on the guide. Whether guide members or protrusions abut on the guide during the transport of the workpiece carrier through the conveyer system depends on the orientation of the positioning plane of the workpiece carrier in which the workpiece carrier is moved relative to the guide of the conveyer system. This means that, depending on the moving direction of the workpiece carriers, either the guide members or the protrusions abut on the guide.

In one embodiment of the conveyer system, it is contemplated that the positioning plane of the workpiece carriers is oriented parallel to the guide direction, and that the two guide members of a first workpiece carrier abut on the two guide members of a second workpiece carrier, or the workpiece base of a first workpiece carrier abuts on the workpiece base of a second workpiece carrier, the two workpiece carriers not overlapping, the two protrusions of both workpiece carriers at least temporarily abutting on the guide during the transport through the conveyer system. In this embodiment, the positioning plane of the workpiece carriers is oriented parallel to the guide direction at least in a segment of the conveyer system. In this orientation, the workpiece carriers cannot overlap or enter each other even when they accumulate. In case of an accumulation of a plurality of workpiece carriers, at least one guide member of a first workpiece carrier abuts on at least one guide member of a second, adjacent workpiece carrier. In this orientation of the positioning plane, the two protrusions of each workpiece carrier serve to guide the workpiece carrier through the conveyer system and, at least temporarily, abut on the guide. Moreover, segments of the contact element adjacent to the apertures may also abut on the guide of the conveyer system to stably guide the workpiece carrier along the guide direction. In this orientation of the positioning plane, side surfaces of the workpieces placed on the workpiece carriers can be readily processed.

In a further embodiment, it is contemplated that the positioning plane of the workpiece carriers is oriented perpendicular to the guide direction, and that the workpiece carriers overlap in sections, a protrusion of a first workpiece carrier being inserted into the aperture of a second workpiece carrier, and a protrusion of the second workpiece carrier being inserted into an aperture of the first workpiece carrier, the guide members of each workpiece carrier, at least temporarily, abutting on the guide during the transport through the conveyer system, the stopper of the first workpiece carrier particularly abutting on the spacer element of the second workpiece carrier. In this embodiment, the positioning planes are oriented perpendicular to the guide direction. In this orientation, it is possible that a plurality of workpiece carriers slides into each other or overlaps along the first moving direction. Therefore, an accumulation is possible in which the positioning planes of adjacent workpiece carriers exhibit only a small distance to each other, and workpieces placed on adjacent workpiece carriers can be lined up very closely. In this orientation of the positioning plane, the guide members of the individual workpiece carriers serve the guidance in the conveyer system. In the vertical orientation of the positioning planes with respect to the guide direction, workpieces placed on the workpiece carrier can be particularly well connected to each other or joined.

Advantageous in the conveyer system is that the workpiece carriers can assume both an orientation with their positioning plane parallel, and an orientation with their positioning plane perpendicular to the guide direction. The orientation of the positioning plane can also be changed within the system. In this way, various processing steps in various orientations of the positioning plane relative to the guide direction can be performed. This renders a complex processing of workpieces within the conveyer system possible. For changing the orientation of the positioning plane, special stations may be provided in the conveyer system, for example, a transfer station or a rotating station which automatically change the orientation of the workpiece carriers relative to the conveyer element or to the guide.

Optionally, it is contemplated that at least one blade is provided which is disposed on or in the guide and is movable in the direction of the conveyer element from the guide as required, the blade being positionable so that it is insertable into the cavity of the workpiece carriers to shift the position of the spacer element relative to the workpiece carrier. In this embodiment, the conveyer system comprises at least one blade which is designed to be movable relative to the guide. When required, i.e., in a case in which the centre distance of the workpiece carriers relative to each other is to be changed, this blade can be moved or advanced towards the workpiece carrier in the direction of the conveyer element. In this advanced state, the blade is then positioned so that it can enter a cavity in a workpiece carrier. Here, this penetration takes place while the workpiece carrier, driven by the conveyer element, passes the blade. The spacer element of the workpiece carrier is shifted by the entry of the blade into the cavity so that the centre distance is changed during the next accumulation of a plurality of workpiece carriers. Likewise, a plurality of blades may be provided in the conveyer system. Alternatively, it is possible that the blade does not enter a cavity in the workpiece carrier but contacts a protruding section of the spacer element and shifts it in this way.

The described conveyer system is suitable for performing a method for charging a plurality of workpiece carriers with workpieces using a conveyer system according to one of the embodiments described above comprising the steps of A) accumulating a plurality of workpiece carriers at a charging position on or in the conveyer element, the positioning planes of the workpiece carriers being oriented perpendicular to the guide direction for the accumulation, and the workpiece carriers overlapping each other, B) placing workpieces on the workpiece carrier, the workpieces having a centre distance to each other which is equal to the distance of two positioning planes of adjacent workpiece carriers in the state of being supplied, a plurality of workpieces being simultaneously placed on a plurality of workpiece carriers, and each workpiece being placed on one workpiece carrier, and C) dissolving the accumulated state of the workpiece carriers by moving the workpiece carriers on the conveyer element.

This method serves to simultaneously place a plurality of workpieces on a plurality of workpiece carriers. From prior art, it is known to individually place one workpiece after the other on a workpiece carrier at a charging station, respectively. This method of charging is time-consuming and therefore reduces the throughput of the conveyer system. The described method renders the simultaneous introduction of a plurality of workpieces into the conveyer system possible. This is useful, for example, in a case in which a plurality of workpieces which can then be introduced into the conveyer system in their entirety in one step is supplied together in a packaging unit. The described method is preferably performed in the order of the process steps A) to C). For this purpose, a plurality of workpiece carriers is accumulated at a charging position in a first process step A), the positioning planes of the workpiece carriers being oriented perpendicular to the guide direction, and the distance between the positioning planes being equal to the centre distance of the workpieces to be placed on a plurality of workpiece carriers together. In this accumulated state, the workpiece carrier will then be briefly stopped and not moved further through the conveyer element. In a second process step B), the workpieces will then be simultaneously placed on the accumulated, stationary workpiece carriers in the state of being supplied, respectively one workpiece being placed on respectively one workpiece carrier. Therefore, a plurality of workpiece carriers can be charged with a workpiece in a single step. After the placement of the workpieces, the charged workpiece carriers are moved on in the conveyer system. During this continued movement, the accumulated state is resolved in a further process step C), the distance between the positioning planes of adjacent workpiece carriers being increased. In this resolved state, the workpieces on the individual workpiece carriers can be readily accessed for processing steps. Optionally, the workpiece carriers may be rotated relative to the guide direction in the conveyer system in a further process step D) after the described process steps A) to C). After this rotation, the positioning planes of the workpiece carriers are then oriented parallel to the guide direction. In this way, the sides of the workpieces which were oriented perpendicular to the guide direction during the charging process are now oriented parallel to the guide direction. In this way, these sides of the workpieces can now be readily accessed and processed from the outside of the conveyer element. After this processing of the side surfaces, it is of course possible to again rotate the workpiece carriers so that their positioning planes are again oriented perpendicular to the guide direction. Due to the fact that the workpiece carriers can be lined up very closely so that the centre distance between adjacent workpiece carriers is small, the simultaneous placement of a plurality of workpieces on a plurality of workpiece carriers can even be performed for workpieces having a very slim design and a small centre distance to each other in the supplied state in the described method. The described method may be supplemented with the method described in the following. Moreover, the described method, in the reverse order of the process steps, may be deployed for simultaneously discharging a plurality of workpieces from a conveyer system.

Finally, the object of the invention is solved by a method for joining a plurality of workpieces using a conveyer system according to one of the embodiments described above comprising the steps of:

A) accumulating a plurality of workpiece carriers, the positioning planes of the workpiece carriers being oriented perpendicular to the guide direction for accumulating, and the workpiece carriers mutually overlapping, and the stopper and the spacer element of adjacent workpiece carriers contacting each other or separating a plurality of workpiece carriers, adjacent workpiece carriers being spaced apart from each other, and the positioning planes being oriented perpendicular or parallel to the guide direction, B) applying a joining material, at least locally, on at least one workpiece, C) pushing together the workpiece carriers, the spacer elements of the workpiece carriers being adjusted so that the stoppers are flush with the apertures of the workpiece carriers so that the workpieces contact each other via the joining material and are joined thereby, the load carriers being particularly lifted off the conveyer element for performing process step B) and/or process step C).

The method according to the invention serves to join a plurality of workpieces which are respectively placed on a workpiece carrier. Here, joining is to be understood to generally refer to the contact of at least two adjacent workpieces or a permanent connection of the workpieces to each other. Joining may take place, for example, by adhesively connecting the workpieces to each other. Here, a material connection between the workpieces is established. Alternatively, joining may also refer to the establishment a positive or non-positive connection. For example, the workpieces may have connecting members which are inserted into each other and fixed thereby during joining. For example, this may be achieved by a workpiece comprising bushes into which protruding pins of an adjacent workpiece are inserted in a positive and/or non-positive manner. For implementing the method according to the invention, a conveyer system is used. The method is preferably performed in the described order of the process steps A) to C).

In a first process step A), a plurality of workpiece carriers the positioning planes of which are oriented perpendicular to the guide direction may be accumulated. This accumulation may take place at various locations along of the conveyer element. During this accumulation, the spacer elements of the workpiece carriers are preferably oriented so that a stopper of an adjacent workpiece carrier cannot enter the aperture in the spacer element. In this way, a larger centre distance between adjacent workpiece carriers is established. Alternatively, the method may also be initiated by a process step A) in which the workpiece carriers are separated, i.e., not accumulated. In this separated state, the positioning planes may be oriented either perpendicular or parallel to the guide direction. Process step A) constitutes the starting point for the following process step B).

In a second process step B), joining material is, at least locally, applied to at least one workpiece. Such a joining material may be, for example, an adhesive or an adhesive film. In a case in which the workpieces are already provided with a joining element such as, for example, a plug-in connection, a bush, a pin or the like provided for establishing a positive and/or non-positive connection in process step A), process step B) may also be omitted. The application of a joining material may be performed from various positions in the conveyer system depending on the orientation of the positioning planes of the workpiece carriers. In case of a perpendicular orientation of the positioning planes to the guide direction, devices may be provided which introduce the joining material between adjacent workpiece carriers and thus workpieces. In case of an orientation of the positioning plane parallel to the guide direction, the joining material may be applied laterally, from a direction perpendicular to the guide direction. In this case in which the positioning plane is oriented parallel to the guide direction during the application of the joining material, a rotation of the workpiece carriers will then take place so that their positioning planes are oriented perpendicular to the guide direction at the completion of process step B).

In a third process step C), the workpiece carriers including the workpieces placed thereon which are provided with the joining material are pushed together. While being pushed together, a workpiece will come into contact with the joining material of the adjacent workpiece so that the workpieces are connected to each other or joined. In order to render the pushing together of adjacent workpiece carriers possible, first, the spacer elements of the workpiece carriers are adjusted so that the stoppers of an adjacent workpiece carrier can enter the apertures in the spacer element. In this way, the centre distance between adjacent workpiece carriers and therefore between adjacent workpieces is reduced. This reduction of the centre distance in turn results in that the workpieces can approach each other to the extent that a contact of the applied joining material takes place. The workpieces are joined by the contact of the joining material. It may be contemplated that the workpieces remain in the pushed-together state for a certain period of time while the joining material cures or sets and a solid connection between the adjacent workpieces is established. After a sufficient solidity is achieved while joining the workpieces, these may be further processed in the conveyer system or removed from the conveyer system.

Particularly in process step C), the workpiece carriers and the workpieces placed thereon have to be aligned with a very high positional accuracy relative to each other. Such positional accuracy is sometimes not given when the workpiece carriers are located on a conveyer element such as, for example, a conveyer belt. The workpiece carriers also move relative to each other during the transport on a conveyer element which may have an interfering effect on a positionally accurate joining. For this reason, it is optionally contemplated that process step C) is performed in a state in which the workpiece carriers are lifted off the conveyer element. For example, the workpiece carriers may be placed on a precise joining plate and pushed together there. In this way, the positional accuracy of the workpiece carriers and therefore the workpieces relative to each other is improved. After having been pushed together, the workpiece carriers may then be returned onto the conveyer element on which they move on through the conveyer system. Optionally, process step B) of applying the joining material may also take place in a state in which the workpiece carriers are temporarily lifted off the conveyer element to improve the positional accuracy of the application of the joining material.

The method according to the invention is advantageous in that joining a plurality of workpieces may take place during the passage through a conveyer system. Joining therefore takes place automatically, and the method according to the invention has a high throughput of workpieces or joined workpieces. The use of the workpiece carriers according to the invention which can be lined up very closely renders positioning the workpiece carriers including the workpieces so close to each other possible during the transport through the conveyer system that joining can take place during transport. At the same time, the workpiece carriers are so tip-resistant that the resulting joining forces are supported via the contact element when they are pushed together. The method according to the invention therefore enables a stable joining process combined with a high workpiece throughput.

Optionally, it is contemplated that the workpieces are removed from the conveyer system together as a joined block after the completion of process step C). In this embodiment, a plurality of workpieces previously introduced into the conveyer system as individual workpieces are removed from the conveyer system as a single joined block. Here, a block is to be understood to refer to the entirety of a plurality of workpieces contacting each other or connected to each other via joining material. Preferably, this removal as a block takes place at a discharge position in or on the conveyer element.

In a further embodiment, it is contemplated that, after the removal of a plurality of workpieces as a joined block, the accumulated state of the workpiece carriers is resolved by moving the workpiece carriers on the conveyer element, and the spacer element of each workpiece carrier is returned so that the stoppers are not flush with the apertures in the spacer elements of the workpiece carriers. In this embodiment, after the removal of the joined workpieces, a state is re-established in which an increased centre distance is present again when a plurality of workpiece carriers accumulates in the first moving direction. For this purpose, each spacer element is shifted into a position in which an insertion of the stopper of an adjacent workpiece carrier into the aperture in the spacer element is no longer possible after the removal of the workpiece carriers. When, starting from this newly established state, then a plurality of workpiece carriers is accumulated again, the stopper of one workpiece carrier will abut on the surface of the spacer element of an adjacent workpiece carrier so that the centre distance is larger than in process step C) when the workpiece carriers are pushed together during joining. With this increase in the centre distance, the initial state of the method prior to process step A) is re-established, and the method can be used again for joining other workpieces in the conveyer system.

Features, effects, and advantages disclosed in connection with the workpiece carrier and the conveyer system are also deemed disclosed in connection with the method. The same applies in the reverse direction; features, effects, and advantages disclosed in connection with the method are also deemed disclosed in connection with the workpiece carrier and the conveyer system.

BRIEF DESCRIPTION OF THE DRAWINGS

In the Figures, embodiments of the invention are schematically illustrated. Here, FIG. 3 shows a perspective view of two workpiece carriers according to the embodiment shown in FIG. 1 in the accumulated state along the first moving direction, FIG. 4 shows a perspective view of two workpiece carriers according to the embodiment shown in FIG. 1 in the accumulated state along a second moving direction.

DETAILED DESCRIPTION

Figure 1:
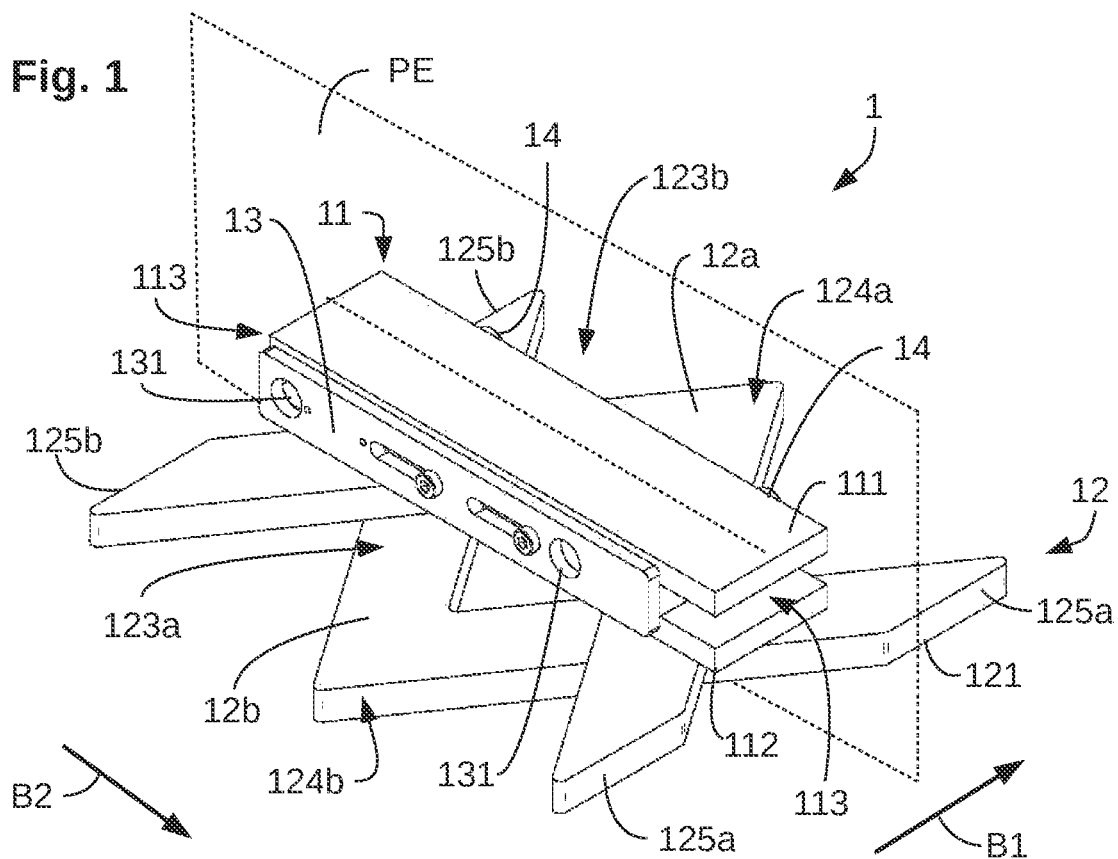
FIG. 1 shows a perspective view of a workpiece carrier according to an embodiment of the invention.

In the Figures, identical elements are designated by the same reference numerals. Generally, the described properties of an element described in connection with a Figure also apply to the other Figures. Directional information such as upper or lower relate to the described Figure and should be applied to other Figures according to their meaning.

FIG. 1 shows a perspective view of a workpiece carrier 1 according to an embodiment of the invention. The workpiece carrier 1 comprises a workpiece base 11 shown on the upper side in the illustration as well as a contact element 12 shown on the lower side. On the side, directed to the front left in the illustration, a spacer element 13 designed to be slidable in its relative position to the workpiece base 11 is disposed on the workpiece base 11 in the embodiment shown. The workpiece base 11 and the contact element 12 are fixedly connected to each other.

The workpiece base 11 is provided for accommodating at least one workpiece on the workpiece carrier 1. For this purpose, the workpiece base 11 comprises a receiving surface 111 oriented upwards in the illustration. In the embodiment shown, the receiving surface 111 is designed to be rectangular and planar. On the side of the workpiece base located opposite of the receiving surface 111, a base surface 112 fixedly connected to the contact element 12 is provided.

The positioning plane PE which represents an imaginary auxiliary geometry for the description of the workpiece carrier 1 is indicated in dashed lines. The positioning plane PE is oriented perpendicular to the contact surface 121 of the contact element 12 directed downwards in the illustration. When the workpiece carrier 1 rests on a horizontally oriented subsurface, for example on a conveyer belt, the positioning plane PE is oriented perpendicular to it, that means vertically oriented. The positioning plane PE bisects the workpiece carrier 1 in its length in the direction of the first moving direction B1 which is indicated by an arrow in the illustration. In the embodiment shown, the positioning plane PE also bisects the receiving surface 111 which is symbolised by the dashed line in the centre of the receiving surface 111. The positioning plane PE serves as a reference geometry in the following description of the workpiece carrier 1 and in the description of the interaction of a plurality of workpiece carriers among each other in a conveyer system. Likewise symbolised by an arrow, a second moving direction B2 is indicated on the left side in front of the workpiece carrier 1. The first moving direction B1 and the second moving direction B2 are preferred directions along which the workpiece carrier 1 is moved in a conveyer system. The various properties of the workpiece carrier 1 while moving along the first moving direction B1 as compared to the movement along the second moving direction B2 are illustrated in FIGS. 3 and 4 and described in connection with these.

In the embodiment shown, the contact element 12 is composed of a first segment 12a disposed on the upper side in a direction perpendicular to the contact surface 121 and a second segment 12b disposed on the lower side in this direction. The first segment 12a disposed on the upper side is fixedly connected to the base surface 112 of the workpiece base 11. The second segment 12b is connected to the first segment 12a on its side facing away from the workpiece base 11. The contact surface 121 on which the workpiece carrier 1 rests on the subsurface, for example on a conveyer element of a conveyer system, is disposed on the side of the second segment 12b facing away from the first segment 12a. In the embodiment shown, the contact surface 121 is designed to be planar and extends across the entire surface of the side of the second segment 12b facing downwards in the illustration. In the embodiment shown, the contact surface 121 and the receiving surface 111 are oriented parallel to each other. However, it is also possible that these two surfaces are oriented at an angle to each other. The contact element 12 comprises two apertures 123a and 123b of which respectively one aperture 123a is disposed in the first segment 12a and a second aperture 123b is disposed in the second segment 12b. In a plan view of the contact surface 121, the two apertures 123a and 123b have a triangular shape in the embodiment shown. The two apertures 123a and 123b are arranged one above the other so that they are offset from each other in a direction perpendicular to the contact surface 121. The openings of the two apertures 123a and 123b are disposed on opposite sides of the contact element 12 in the first moving direction B1. The contact element 12 further comprises two protrusions 124a and 124b which are also disposed in a direction perpendicular to the contact surface 121 so that they are offset relative to each other. In the embodiment shown, the first protrusion 124a is formed by the triangular-shaped, protruding tip of the upper first segment 12a directed to the rear right in the illustration. The second protrusion 124b is formed by the triangular-shaped, protruding tip of the lower segment 12b directed to the front left in the illustration. In a direction perpendicular to the contact surface 121, the first aperture 123a is disposed adjacent to the second protrusion 124b, and the second aperture 123b is disposed adjacent to the first protrusion 124a. The protrusions 124a and 124b are designed to be complementary in shape to the apertures 123a and 123b so that the protrusions 124a and 124b can be inserted into the apertures 123a and 123b of respectively adjacent workpiece carriers 1. When two identically designed workpiece carriers 1 are moved towards each other perpendicular to their positioning planes PE or parallel to the first moving direction B1 the protrusion 124a disposed closer to the workpiece base 11 in a direction perpendicular to the contact surface 121 is insertable into the aperture 123a of an adjacent workpiece carrier 1 disposed closer to the workpiece base 11 in this direction. Such a state is illustrated, for example, in FIG. 3. At the same time, the second protrusion 124b disposed closer to the contact surface 121 in a direction perpendicular to the contact surface 121 is insertable into the second aperture 123b of another workpiece carrier 1 disposed closer to the contact surface 121 in this direction during the described approximation of two identically designed workpiece carriers 1. With this insertion of the protrusions 124a, 124b into the apertures 123a, 123b, adjacent workpiece carriers 1 overlap each other, and the centre distance S which is equal to the distance between the positioning planes PE of adjacent workpiece carriers 1 can be significantly reduced as compared to a state in which the protrusions 124a, 124b are not inserted into the apertures 123a, 123b. Owing to this sectional insertion of two adjacent workpiece carriers 1 into each other, these can be temporarily stored in a space-saving manner in an accumulated state in a conveyer system. According to the invention, both apertures 123a and 123b extend, in sections, on both sides of the positioning plane PE in the first moving direction B1. The first aperture 123a begins at ends of the V-shaped first segment 12a directed to the front left and extends up to the inner tip of the first segment 12a hidden by the workpiece base 11 in the illustration in the first moving direction B1. Mirrored relative to the positioning plane PE, the second aperture 123b extends from the ends of the second segment 12b directed to the rear right up to the inner tip of the second segment 12b also designed in a V-shape which is visible on the left side in front of the spacer element 13 in the illustration. The length of the two apertures 123a and 123b is therefore larger than half the overall length of the workpiece carrier 1 in the first moving direction B1. As can be clearly seen in FIG. 1, both apertures 123a and 123b extend through the positioning plane PE. In the embodiment shown, the two protrusions 124a and 124b are formed by the outward-facing outer surfaces of the segments 12a and 12b designed in a V-shape. The first protrusion 124a is to be understood to be the section of the first segment 12a which, starting from the two guide members 125a and 125b on the outer sides, extends up to the tip directed to the rear right. It can be clearly seen that this first protrusion 124a, in sections, also extends on two opposite sides of the positioning plane PE. The same applies to the second protrusion 124b which, mirrored about the positioning plane PE with respect to the first protrusion 123a in a plan view of the contact surface 121, is disposed on second segment 12b.

In the embodiment shown, the two segments 12a and 12b are substantially formed identically and have an identical size. However, the two segments 12a and 12b are differently oriented relative to the positioning plane PE. In a plan view of the contact surface 121, each segment 12a and 12b has an outer contour on a first side which substantially corresponds to the outer contour of this segment 12a and 12b on its side located opposite in the first moving direction B1. In the embodiment shown, these two outer contours located opposite of each other are respectively designed in a V-shape. In this way, the protrusions 124a and 124b formed by a first outer contour are designed to be complementary in shape to the apertures 123a and 123b formed by the oppositely-disposed second outer contour and can, in this way, be inserted into each other particularly well. In a plan view of the contact surface, the entire contact element 12 is formed so that it is symmetric to the positioning plane PE, the contact element 12 being formed by the two segments 12a and 12b disposed one above the other. Such a plan view of the contact surface 121 can be seen, for example, in FIGS. 5 and 7. Moreover, in a plan view of the contact surface 121, the contact element 12, and also each segment 12a and 12b on its own, are designed to be axially symmetric about an axis oriented perpendicular to the positioning plane PE. In the embodiment shown, this symmetry axis extends through the tips of the two protrusions 124a and 124b facing outwards. In the embodiment shown, each segment 12a and 12b is formed in a V-shape in a plan view of the contact surface. The two arms of the V extend in a straight line and are aligned at an angle of about 70° relative to each other. This angle between the arms of the V may, however, also be implemented differently and is preferably in a range from 5° to 150°. The shown V-shape of the two segments 12a and 12b is, on the one hand, advantageous because it is readily producible and assemblable into a contact element 12. On the other hand, the V-shape with its planar, linear outer contours also renders a transverse accumulation of a plurality of workpiece carriers possible which will be described later. The two segments 12a and 12b may, of course, also have another shape, for example, a double V-shape or also a shape including rounded or curved outer contours in the direction of the first moving direction B1.

In the embodiment shown, the contact element 12 includes altogether four guide members 125a, 125b, respectively two of which are disposed on the first segment 12a, and two more of which are disposed on the second segment 12b. These guide members 125a, 125b are provided to, at least temporarily and/or in sections, abut on a guide during the transport of the workpiece carrier 1 through a conveyer system. In the embodiment shown, each guide member 125a, 125b is formed by a planar guide surface. However, each guide member 125a, 125b may alternatively also be formed by a combination of two guide points or by a guide line. The guide members 125a, 125b are disposed on the outside of the contact element 12 in a direction perpendicular to the first moving direction B1. In the embodiment shown, the guide members 125a, 125b are disposed on the free ends of the arms of the segments 12a and 12b designed in a V-shape. Here, the free ends are to be understood to be the ends which are not connected to each other at the tip of the V. The guide members 125a, 125b are disposed on the front sides of the free ends of the arms, the guide members 125a, 125b on the first segment 12a being flush with the guide members 125a, 125b on the second segment. In the embodiment shown, the guide members 125a, 125b implemented as guide surfaces extend parallel to the first moving direction B1 and perpendicular to the positioning plane PE. The guide members 125a, 125b serve the guidance in the conveyer system during a movement of the workpiece carrier parallel to the first moving direction B1. In case of a movement of the workpiece carrier 1 in the second moving direction B2, the guide members 125a, 125b may also serve as mutual abutment surfaces of two adjacent workpiece carriers 1. This state is illustrated, for example, in FIG. 4.

Figure 9:
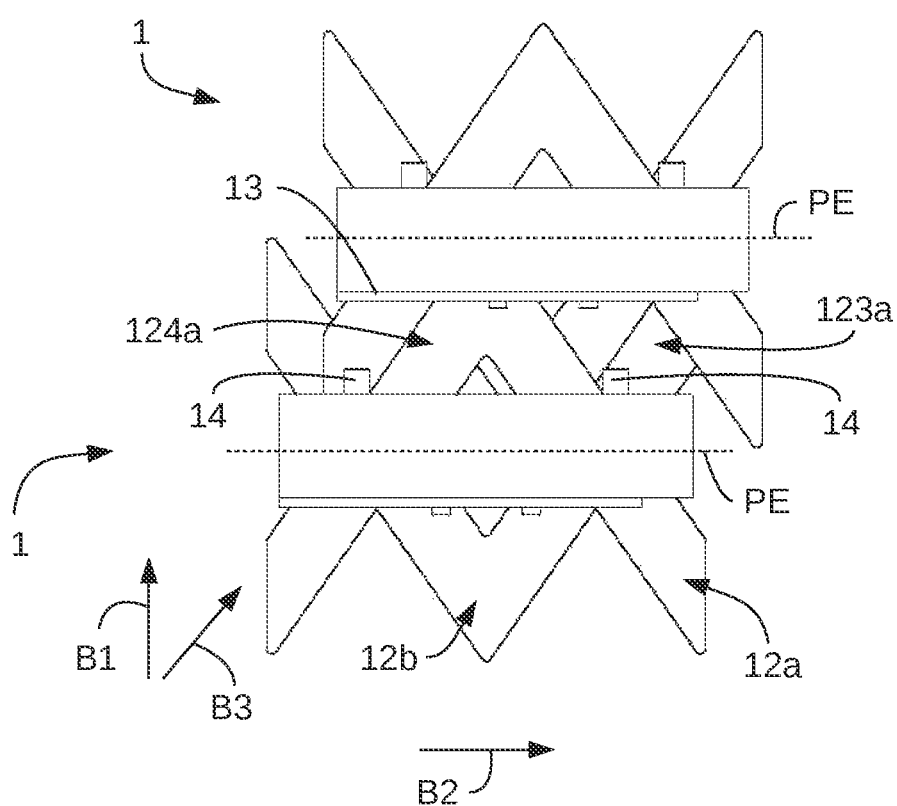
FIG. 9 shows a plan view of two workpiece carriers according to the embodiment shown in FIG. 1 during the accumulation from a transverse moving direction.

In FIG. 1, the first moving direction B1 in which an insertion of a plurality of workpiece carriers 1 into each other is possible, and the second moving direction B2 in which an insertion of a plurality of workpiece carriers 1 into each other is not possible are symbolically indicated by arrows. In addition, however, it also is possible to insert a plurality of workpiece carriers 1 into each other in a direction which is situated between the first moving direction B1 and the second moving direction B2. For example, starting from the state shown in FIG. 1, a second workpiece carrier 1 (not shown) which is oriented in space like the shown workpiece carrier 1 may be moved, from the front left in the illustration, in a direction towards the shown workpiece carrier 1 which, with respect to the first moving direction B1 symbolised by the arrow, deviates to the rear left by, for example, 30°. In this case, the first protrusion 124a of the second conveyed workpiece carrier 1 also enters the first aperture 123a of the shown workpiece carrier 1, however, from a direction oriented transverse to the first moving direction B1. Here, the outer contour of the first protrusion 124a of the conveyed workpiece carrier encounters the inner contour in the aperture 123a of the shown workpiece carrier 1. Due to the fact that both the outer contour of the protrusion 124a and the inner contour of the aperture 123a are designed to be planar, the two contours slide along each other whereby the transverse delivery of the second workpiece carrier 1 is translated into a movement of the second workpiece carrier parallel to the first moving direction B1. Due to this translation among the two contours, therefore, the first protrusion 124a will be ultimately inserted into the first aperture 123a even in case of a transverse delivery of a second workpiece carrier 1. The same applies to the second protrusion 124a and the second aperture 123b. This transverse conveyability which also results in an insertion of adjacent workpiece carriers 1 into each other and therefore in an accumulation facilitates directing the workpiece carriers in different directions within the conveyer system. Due to the fact that adjacent workpiece carriers 1 virtually guide themselves in case of a transverse mutual delivery, other segments of the conveyer system can be implemented in a considerably simpler and therefore more reliable and cost-effective way. Particularly, expenses for stations for rotating or deflecting the workpiece carriers in the conveyer system are avoided. The V-shape which the two segments 12a and 12b exhibit in the embodiment shown is particularly favourable for such a transverse delivery of workpiece carriers 1 since the planar outer contours of the segments 12a and 12b render such a transverse delivery from two transverse directions possible. Moreover, workpiece carriers can also be separated again in a transverse direction starting from the accumulated state shown in FIG. 3. Starting from the state shown in FIG. 3, a workpiece carrier can be moved in a direction situated between the first moving direction B1 and the second moving direction B2. In this case, the outer contour of a protrusion 124a, 124b also first slides along an inner contour of an aperture 123a, 123b until the protrusion 124a, 124b has left the aperture 123a, 123b. From then on, the released workpiece carrier 1 can be separately moved along the new moving direction. For such a transverse delivery or accumulation and subsequent separation in a transverse direction, is it particularly favourable that part of the outer surfaces or outer contours of the two segments 12a and 12b is, at least in sections, designed to be planar. Preferably, the two arms of the segments 12a, 12b designed in a V-shape are respectively oriented at an angle of 1° to 89° to the positioning plane PE. For rendering a uniform transverse accumulation or separation in opposing transverse directions possible, the angles of the two arms of the V are preferably oriented at an identical angle to the positioning plane PE. A state during a transverse accumulation of two workpiece carriers 1 is illustrated in FIG. 9.

The workpiece carrier 1 in the embodiment shown in FIG. 1 comprises a spacer element 13 which is provided to adjust the distance between two adjacent workpiece carriers 1 in the first moving direction B1 in cooperation with at least one stopper 14. In the embodiment shown, the spacer element 13 is implemented in a plate-shape. The spacer element 13 is laterally disposed on the workpiece holder 11 between the receiving surface 111 and the first segment 12a of the contact element 12. The spacer element 13 is movably connected to the workpiece holder 11. This movable connection is achieved by elongated holes extending through the spacer element 13 in a direction parallel to the first moving direction B1 being incorporated in the spacer element 132. The spacer element 13 is connected to the workpiece holder 11 by two screws respectively one of which extends through an elongated hole. The spacer element 13 is held in a sliding seat on the workpiece holder 11 by the heads of the screws. The longitudinal alignment of the elongated holes is oriented perpendicular to the first moving direction B1. This results in the spacer element 13 being slidable perpendicular to the first moving direction B1 and parallel to the positioning plane PE. In the embodiment shown, the spacer element includes two circular apertures 131 which respectively extend through the spacer element 13 in the first moving direction B1. When the spacer element 13 is shifted parallel to the positioning plane PE the relative position of the apertures 131 to the workpiece holder 11 is changed. On the side of the workpiece holder 11 located opposite of the spacer element 13, two stoppers 14 are disposed which are only visible in sections in the illustration in FIG. 1. The two stoppers 14 can be seen more clearly, for example, in FIG. 5. Each of the stoppers 14 extends in a direction perpendicular to the positioning plane PE and parallel to the receiving surface 111. Each stopper 14 has a shape and size which is insertable into one of the apertures 131 in the spacer element 13 of another workpiece carrier 1. In the embodiment shown, each stopper 14 is implemented as a protrusion which is formed like a circular cylinder and protrudes beyond the side surface of the workpiece holder 11. In a first position of the spacer element 13 relative to the workpiece base 11, respectively one aperture 131 is flush with a stopper 14. In a second position of the spacer element 13 relative to the workpiece base 11, the apertures 131 are shifted relative to the stoppers 14 perpendicular to the first moving direction B1. With a change of the position of the spacer element 13 relative to the workpiece base 11, it can be adjusted whether or not the stoppers 14 can enter the aperture 131 of an adjacent workpiece carrier during an accumulation of a plurality of workpiece carriers 1 in the first moving direction B1. In this way, the centre distance S between two adjacent workpiece carriers 1 can be adjusted. This adjustability is illustrated in FIGS. 5 to 8 and described accordingly. In the embodiment shown, the position of the spacer element 13 can be automatically adjusted during the transport of the workpiece carrier 1 through a conveyer system.

For this reason, the workpiece base 11 includes respectively one cavity 113 extending through the workpiece base 11 in a direction perpendicular to the positioning plane PE on its front sides in the second moving direction B2. Each of the two cavities 113 is open on the front side of the workpiece base 11 implemented as a cuboid. In the state shown in FIG. 1, the spacer element 13, as regarded from the first moving direction B1, protrudes into the cavity 113 disposed on the rear left. However, the spacer element 13 does not protrude into the cavity 113 disposed on the front right. Starting from the state shown, the spacer element 13 can be shifted to the front right relative to the workpiece base 11 by inserting an object, particularly a blade of a conveyer system, into the cavity 113 on the rear left. In this shifted state, the spacer element 13 will then protrude into the cavity 113 on the front right. By inserting an object into one of the two cavities 113, therefore, the relative position of the spacer element 13 to the workpiece base 11 can be adjusted. With this adjustment, the position of the two apertures 131 is also adjusted which in turn has an influence on whether or not the stoppers 14 of an adjacent workpiece carrier 1 are insertable into the apertures 131. Instead of the provision of the two cavities 113, the spacer element 13 may also be designed to be longer than the workpiece base 11 so that it always protrudes beyond the workpiece base 11 on least one side. In this case, the overall length of the spacer element 13 is larger than the overall length of the workpiece base 11 parallel to the positioning plane PE. In this case, the spacer element 13 can be shifted from the outside by an object without it entering a cavity 113. In this case, the cavities 113 are not provided and not required either.

Figure 2:
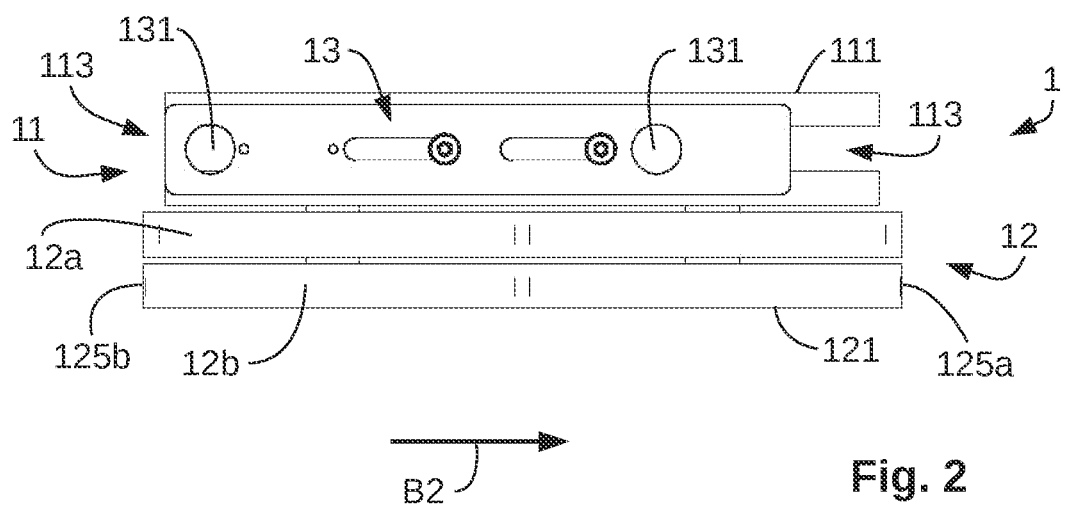
FIG. 2 shows a front view in the direction of a first moving direction of a workpiece carrier according to the embodiment shown in FIG. 1.

FIG. 2 shows a front view of a workpiece carrier 1 according to the embodiment shown in FIG. 1 in the direction of the first moving direction B1. FIG. 2 shows the same embodiment in the same state as FIG. 1. Therefore, the description relating to FIG. 1 is made reference to for the elements not complementarily described in connection with FIG. 2. In the front view in FIG. 2, it is clearly visible that the first segment 12a and the second segment 12b are disposed one above the other, the guide members 125a, 125b respectively disposed on these segments 12a, 12b being flush with each other. Between the second segment 12b and the first segment 12a as well as between the first segment 12a and the workpiece base 11, there is a distance defined by a spacer disc disposed between the elements. This distance or these distances prevent adjacent workpiece carriers 1 from getting jammed or stuck during an accumulation in the first moving direction B1. In the embodiment shown, the width of the contact element 12 is larger than the width of the workpiece base 11 in the second moving direction B2. Such a wide implementation of the contact element 12 and therefore the contact surface 121 also results in a high tipping resistance of the workpiece carrier 1 in the second moving direction B2. In the view in FIG. 2, it is clearly visible that the spacer element 13 is inserted into or overlaps the cavity 113 disposed on the left side. However, the spacer element 13 does not or only to a very small extent protrude into the cavity 113 disposed on the right side. Starting from the state shown in FIG. 2, the spacer element 13, guided by the elongated holes provided therein, can be shifted to the right so that it will then protrude into the cavity 113 disposed on the right side. In the front view in FIG. 2, it is also clearly visible that both the contact surface 121 and the receiving surface 111 are designed to be planar, both surfaces being oriented parallel to each other.

FIG. 3 shows a perspective view of two workpiece carriers 1 according to the embodiment shown in FIG. 1 in the accumulated state along the first moving direction B1. Two workpiece carriers 1 which are identical to the workpiece carrier in FIG. 1 can be seen. The two workpiece carriers 1 are pushed into each other in the direction of the first moving direction B1. It can be clearly seen that the second protrusion 124b of the workpiece carrier 1 shown on the rear right is inserted into the second aperture 123b of the workpiece carrier 1 shown on the front left. The second protrusion 124b of the right workpiece carrier 1 is inserted into the second aperture 123b of the left workpiece carrier 1 beyond the positioning plane PE of the left workpiece carrier 1. Moreover, the first protrusion 124a of the left workpiece carrier 1 is inserted into the first aperture 123a beyond the positioning plane PE of the right workpiece carrier 1. Furthermore, it can be seen that the first segments 12a and the second segments 12b of both workpiece carriers 1 are respectively spaced apart from each other and oriented parallel to each other. All guide members 125a of the two workpiece carriers 1 are flush with each other in the shown accumulated state. The same applies to all guide members 125b. In the shown state, the two workpiece carriers 1 abut on each other, the two stoppers 14 of the left workpiece carrier 1 abutting on the spacer element 13 of the right workpiece carrier 1 without entering its apertures 131. This abutment can be seen more clearly in the plan view in FIG. 7 and is described in this context. The distance between the two positioning planes PE of the adjacent workpiece carriers 1 is the centre distance S. In the case in which workpieces are placed on the workpiece carrier 1 with their centre planes congruent with the positioning plane PE, the centre distance S is also equal to the centre distance of the mounted workpieces. The length L or the overall length of the left workpiece carrier 1 in the first moving direction B1 extends from the end of the first segment 12a facing leftwards to the end of the second segment 12b facing rightwards. The length L may also be defined as distance between the tips of the segments 12a and 12b designed in a V-shape. In FIG. 3, it can be clearly seen that, in the accumulated state, the centre distance S is smaller than half the length L of the workpiece carrier 1. In this way, it is possible to accumulate a plurality of workpiece carriers 1 in a space-saving manner while the workpiece carriers 1, at the same time, have a large length L which results in a high resistance to tipping in the first moving direction B1. In a conveyer system which is not shown, the guide members 125a, 125b, at least temporarily, abut on a guide. The guide direction determined by the guide of the conveyer system substantially corresponds to the first moving direction B1 in the state shown. The abutment of the guide members 125a, 125b on the guide results in that the orientation of the positioning plane PE relative to guide direction will always remain the same and that the workpiece carriers 1 cannot rotate. In the conveyer system, the contact surfaces 121 rest on the surface of a conveyer element which may be formed by, for example, a conveyer belt.

FIG. 4 shows a perspective view of two workpiece carriers 1 according to the embodiment shown in FIG. 1 in the accumulated state along a second moving direction B2. In contrast to FIGS. 1 and 3, the positioning planes PE of two workpiece carriers 1 are oriented parallel to the second moving direction B2 in FIG. 4. The positioning planes PE are oriented parallel to the guide direction of the conveyer system. In this orientation, adjacent workpiece carriers 1 cannot be pushed into each other. In the shown accumulated state along the second moving direction B2, the guide members 125*a* of the workpiece carrier 1 shown on the left abut on the guide members 125*b* of the workpiece carrier 1 shown on the right. In this orientation, the accumulated workpiece carriers 1 do not overlap. The positioning planes PE of the accumulated workpiece carriers 1 are flush with each other. In a conveyer system, the guide direction extends parallel to the second moving direction B2 in the state shown. During the transport of the workpiece carriers 1 through the conveyer system, the protrusions 124*a*, 124*b* of the workpiece carriers 1, at least temporarily, abut on the guide of the conveyer system so that the workpiece carriers 1 are guided and cannot rotate during transport. In the shown accumulated state along the second moving direction B2, each positioning plane PE is readily accessible from a direction perpendicular to the second moving direction B2 which facilitates processing of a workpiece placed on the workpiece carrier 1. For example, when a plate-shaped workpiece is placed on the workpiece carrier with its central plane congruent to the positioning plane PE, the large side surfaces of this plate-shaped workpiece can be processed in a particularly easy manner while the workpieces can remain on the workpiece carrier 1. A particular advantage in the workpiece carrier 1 according to the invention is that it can be used both in the state shown in FIG. 4 and in the state shown in FIG. 3. In a conveyer system, it is possible to transfer the workpiece carriers from the state shown in FIG. 4 to the state shown in FIG. 3 and vice versa during transport. This allows for an extremely high flexibility in processing the workpieces placed on the workpiece carrier 1. Depending on the processing step to be performed, the orientation of the positioning plane PE relative to the guide direction of the conveyer system can be easily changed.

In FIGS. 5 to 8, it is illustrated how, in the event of an accumulation of a plurality of workpiece carriers along the first moving direction B1, the centre distance S between the positioning plane PE of adjacent workpiece carriers 1 can be adjusted by the spacer element 13. This adjustment of the centre distance S may be used, for example, for performing a method in which the workpieces respectively mounted on a workpiece carrier 1 are joined during transport.

Figure 5:
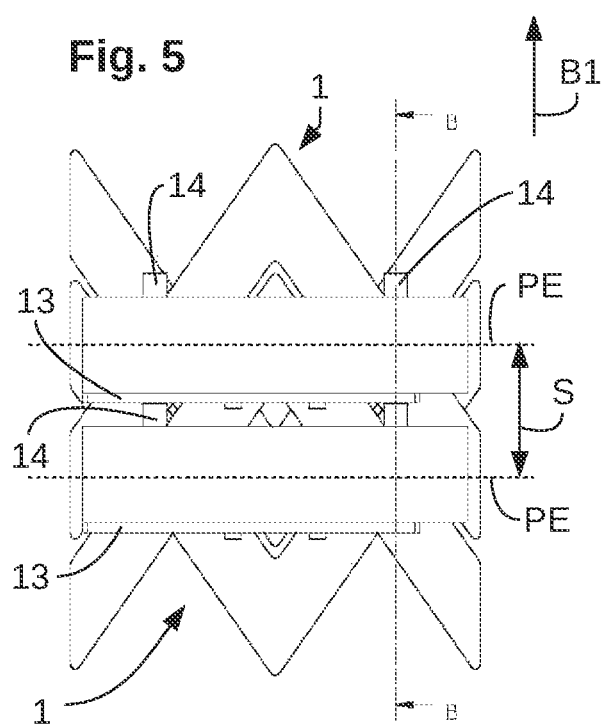
FIG. 5 shows a plan view of two workpiece carriers according to the embodiment shown in FIG. 1 in the accumulated state along the first moving direction having a first centre distance.

FIG. 5 shows a plan view of two workpiece carriers 1 according to the embodiment shown in FIG. 1 in the accumulated state along the first moving direction B1 having a first centre distance S. FIG. 5 shows the state shown in FIG. 3 in a plan view from above in a direction perpendicular to the contact surface 121. With regard to the elements and components in FIG. 5, complementarily, also the description of FIGS. 1 and 3 is made reference to. In the plan view, the positioning planes PE of the workpiece carriers 1 are illustrated in dashed lines. The centre distance S is equal to the distance between the positioning planes PE of the two accumulated workpiece carriers 1 disposed adjacent to each other. In the state shown, the spacer element 13 of the workpiece carrier 1 shown at the upper side is located in a second position in which the two apertures 131 in the spacer element 13 are not located opposite of the two stoppers 14 in a direction perpendicular to the positioning plane PE. In the state shown, the two apertures 131 are offset relative to the two stoppers 14 in a direction parallel to the positioning plane PE. Therefore, the two stoppers 14 of the workpiece carrier 1 shown on the lower side cannot be inserted into the two apertures 131 of the workpiece carrier 1 shown on the upper side but abut on the surface of the spacer element 13 of the upper workpiece carrier 1 facing away from the workpiece holder 11. In the state shown, this abutment of the stoppers 14 on the surface of the spacer element 13 determines the centre distance S. The centre distance S can be structurally influenced or adjusted by the length of the stoppers 14 in a direction perpendicular to the positioning plane PE. It is also possible to design the stoppers 14 so that they are exchangeable so that the centre distance S can be influenced in a simple manner by exchanging the stoppers 14 when required. In FIG. 5, it can be seen that there is a distance between the segments 12*a*, 12*b* of the adjacent workpiece carriers 1. This distance can be seen, for example, between the two tips of the segments 12*a*, 12*b* designed in a V-shape.

Figure 6:
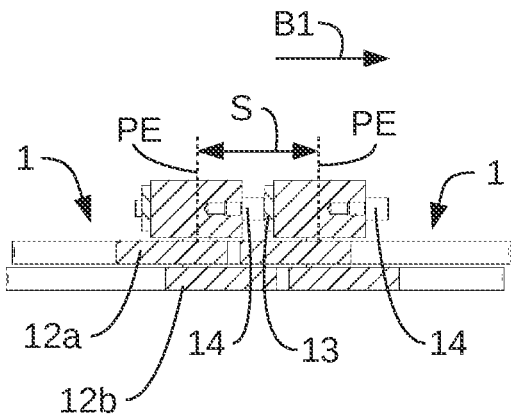
FIG. 6 shows a side view of the workpiece carriers shown in FIG. 5.

FIG. 6 shows a side view of the workpiece carrier 1 shown in FIG. 5. In this illustration, the workpiece carriers 1 are illustrated in a cross-section in the same state as in FIG. 5. The sectional plane is designated by B-B in FIG. 5. In the cross-sectional view in FIG. 6, it can be seen that the stoppers 14 of the workpiece carrier 1 shown on the left abut on the leftward-facing surface of the spacer element 13 of the workpiece carrier 1 shown on the right. In the first moving direction B1, a distance is present between the first segments 12*a* and the second segments 12*b* of the two workpiece carriers 1.

Figure 7:
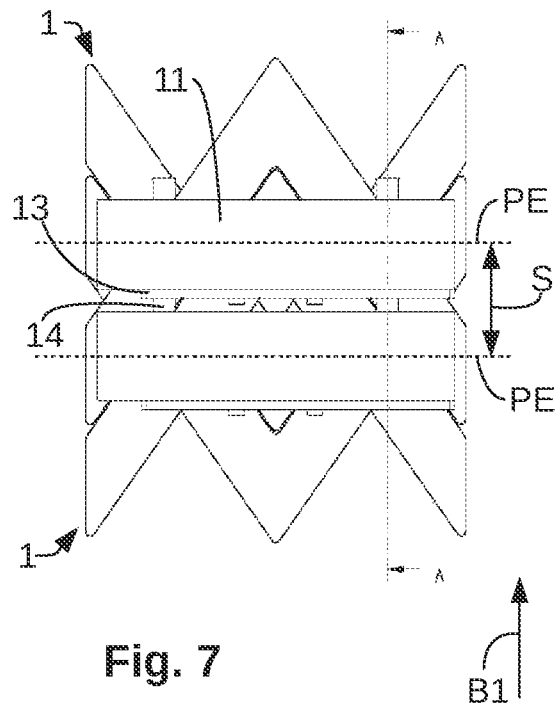
FIG. 7 shows a plan view of two workpiece carriers according to the embodiment shown in FIG. 1 in the accumulated state along the first moving direction having a second, reduced centre distance.

FIG. 7 shows a plan view of two workpiece carriers 1 according to the embodiment shown in FIG. 1 in the accumulated state along the first moving direction B1 having a second, reduced centre distance S. FIG. 7 shows a state in which, starting from the state shown in FIGS. 5 and 6, the spacer elements 13 of the two workpiece carriers 1 were shifted to the right. For example, this shift may take place automatically by inserting a blade into the cavity 113 in the workpiece holder 11 from the side. Alternatively, the spacer elements 13 may also be moved in another way, for example, electronically controlled by a servo drive, a magnetic switch, or the like. By shifting the spacer elements 13 parallel to the positioning plane PE, a state is established in FIG. 7 in which the apertures 131 in the spacer elements 13 are flush with the stoppers 14 disposed oppositely on the workpiece holder 11. In this way, the stoppers 14 of the workpiece carrier 1 shown on the lower side can enter the apertures 131 in the spacer element 13 of the workpiece carrier 1 shown on the upper side. In this way, the two workpiece carriers 1 can be pushed further into each other until the faces of the stoppers 14 abut on the surface of the workpiece holder 11 of the adjacent workpiece carrier 1 or the workpieces on adjacent workpiece carriers 1 contact each other. The centre distance S between the two positioning planes PE is therefore smaller in FIG. 7 than the centre distance S in the state shown in FIG. 5. Between the segments 12*a* and 12*b* of the adjacent workpiece carriers 1, only a very small distance is still present which is clearly visible, for example, in the area of the tips of the first segments 12*a* designed in a V-shape.

Figure 8:
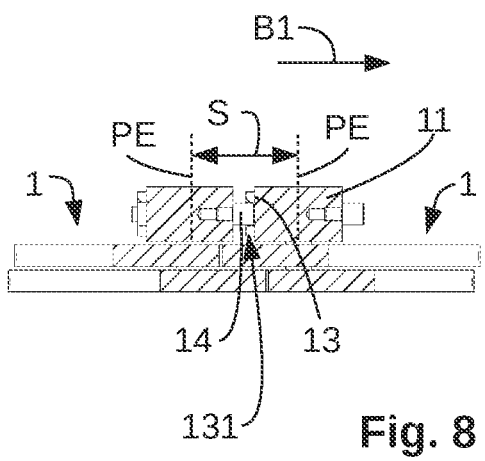
FIG. 8 shows a side view of the workpiece carriers shown in FIG. 7.

FIG. 8 shows a side view of the workpiece carriers 1 shown in FIG. 7. In this illustration, the workpiece carriers 1 are illustrated in the cross-section in the same state as in FIG. 7. The sectional plane is designated by A-A in FIG. 7. In the cross-sectional view in FIG. 8, it can be seen that the stoppers 14 of the workpiece carrier 1 shown on the left enter the apertures 131 in the spacer element 13 of the workpiece carrier 1 shown on the right, extend through these apertures 131, and abut on the surface of the workpiece holder 11 facing leftwards. Between the first segments 12*a* and the second segments 12*b* of the two workpiece carriers 1, there is a very small distance in the first moving direction B1 which is significantly smaller than the distance between these elements in the state shown in FIG. 6. In order to again increase the centre distance S during accumulation starting from the state shown in FIGS. 7 and 8, the workpiece carriers 1 have to be separated from each other to the extent that the spacer elements 13 can be pushed back into the state shown in FIGS. 5 and 6. This increase in the centre distance S may also take place automatically during the transport of the workpiece carriers 1 in a conveyer system.

The adjustability of the centre distance S between two accumulated workpiece carriers 1 disposed adjacent to each other described in connection with FIGS. 5 to 8 may be used, for example, for performing of a joining method on workpieces. The workpieces are first placed on workpiece carriers 1 positioned at a larger centre distance S to each other. Then, a joining material, for example an adhesive, is introduced or applied between the workpieces. The actual joining process of the workpieces will then take place by the centre distance S being reduced as described. In this way, the distance between the workpieces is also reduced so that these are joined, particularly bonded, by the interposed joining material. This joining process may be automatically performed during the passage through a conveyer system. A combination of a plurality of workpiece carriers 1 according to the invention is particularly suitable for joining end products assembled from a plurality of individual, plate-shaped parts. For example, batteries made of a plurality of individual plate-shaped cells can be readily and efficiently joined or assembled.

FIG. 9 shows a plan view of two workpiece carriers 1 according to the embodiment shown in FIG. 1 while accumulating from a transverse moving direction B3. In the state shown in FIG. 9, the workpiece carrier 1 shown on the upper side is at rest and, for example, in a standby position in which a plurality of workpiece carriers 1 is to be accumulated. The workpiece carrier 1 disposed on the lower side in the illustration moves towards the stationary workpiece carrier 1 from a transverse moving direction B3. The transverse moving direction B3 is different from the first moving direction B1 and the second moving direction B2. The transverse moving direction B3 is situated between the first moving direction B1 and the second moving direction B2 and is oriented at an acute angle to the first moving direction B1. Such movement of a workpiece carrier 1 along a transverse moving direction B3 may occur, for example, when a plurality of workpiece carriers 1 is to be moved around a curve or a bend in the conveyer element in a conveyer system. As can be seen in FIG. 9, workpiece carriers 1 moving along a transverse moving direction B3 can be accumulated in a similar manner as in case of a movement of the workpiece carriers 1 along the first moving direction B1. In the state shown, the first protrusion 124*a* of the lower workpiece carrier 1 has already entered the first aperture 123*a*. Here, the outer contour of the first protrusion 124*a* of the lower workpiece carrier 1 which is designed to be planar and directed towards the top left in the illustration abuts on the inner contour of the first aperture 123*a* of the upper workpiece carrier 1 which is also designed to be planar. Owing to the planar design of these contours, the two workpiece carriers 1 slide along each other until the stoppers 14 of the lower workpiece carrier abut on the spacer element 13 of the upper workpiece carrier. This state can be seen, for example, in FIG. 3 or in FIG. 5. The symmetric V-shape of the two segments 12*a* and 12*b* is particularly favourable for the illustrated transverse accumulation of a plurality of workpiece carriers 1. On the one hand, this V-shape provides for planar outer contours of the protrusions 124*a* and 124*b* as well as also for planar inner contours of the apertures 123*a* and 123*b* which, as illustrated, can slide along each other. On the other hand, the V-shape allows for a transverse accumulation in transverse moving directions B3 oriented differently from the first moving direction B1. For example, the lower workpiece carrier 1 could also be moved towards the upper workpiece carrier in a transverse moving direction B3 extending mirror-inverted to the illustrated transverse moving direction B3 relative to the first moving direction B1. Redirecting the workpiece carriers 1 in two differently oriented directions in relation to the current moving direction is therefore possible. The larger the angle between the two arms of the segments 12*a* and 12*b* designed in a V-shape is, the larger the angle stretching between the first moving direction B1 and the transverse moving direction B3 may be. A particular advantage in the shown embodiment is that the accumulated state of a plurality of workpiece carriers 1 illustrated, for example, in FIG. 5 is always identical in an accumulation from many different transverse moving directions B3 as well as from the first moving direction 1. The shown embodiment of a workpiece carrier 1 is therefore particularly versatile and allows for an easy accumulation from various, even tolerance-affected or varying moving directions. To complement the details relating to the workpiece carriers 1 and the various accumulation options not described in connection with FIG. 9, the description relating to FIG. 1 is made reference to.

LIST OF NUMERALS

1 Workpiece carrier
11 Workpiece base
111 Receiving surface
112 Base surface
113 Cavity
12 Contact element
12*a*, 12*b* First segment, second segment
121 Contact surface
123*a*, 123*b* First aperture, second aperture
124*a*, 124*b* First protrusion, second protrusion
125*a*, 125*b* First guide member, second guide member
13 Spacer element
131 Aperture
14 Stopper
B1, B2, B3 First moving direction, second moving direction, transverse moving direction
L Length
PE Positioning plane
S Centre distance

What is claimed is:

1. A workpiece carrier for transporting a workpiece or a product in a conveyer system, comprising:
at least one workpiece base provided for accommodating at least one workpiece, wherein the workpiece base includes a receiving surface on which a workpiece is mountable, and the workpiece base further includes a base surface which is disposed at a distance from the receiving surface; and
at least one contact element, which, in the operation of the workpiece carrier, is provided to rest on a conveyer element of a conveyer system including a contact surface, wherein the contact element is connected to the base surface of the workpiece base,
wherein a first moving direction along which the workpiece carrier is movable in a conveyer system is provided for the workpiece carrier, and a positioning plane is defined which is oriented perpendicular to the contact surface and perpendicular to the first moving direction, wherein the positioning plane intersects the receiving surface and is disposed in the centre of the length of the workpiece carrier along the first moving direction, and wherein the contact element includes at least two apertures which are disposed so that they are offset relative to each other in a direction perpendicular to the contact surface, and wherein the contact element includes at least two protrusions which are disposed so that they are offset relative to each other in a direction perpendicular to the contact surface, wherein the protrusion of one workpiece carrier disposed closer to the workpiece base in a direction perpendicular to the contact surface is insertable into the aperture of another workpiece carrier disposed closer to the workpiece base in a direction perpendicular to the contact surface in a direction perpendicular to the positioning plane, and the protrusion of one workpiece carrier disposed closer to the contact surface in a direction perpendicular to the contact surface is insertable into the aperture of another workpiece carrier disposed closer to the contact surface in a direction perpendicular to the contact surface in a direction perpendicular to the positioning plane, and wherein each of the apertures, at least in sections, extends on both of two opposing sides of the positioning plane.

2. The workpiece carrier according to claim 1, wherein each of the apertures and each of the protrusions, at least in sections, extends on two opposing sides of the positioning plane so that, when a protrusion of a first workpiece carrier is inserted into an aperture of a second workpiece carrier, the first and the second workpiece carrier can be positioned relative to each other so that the distance between their positioning planes is smaller than half the length of a workpiece carrier in a direction perpendicular to the positioning plane.

3. The workpiece carrier according to claim 1, wherein the contact element includes at least two guide members which respectively comprise at least two guide points which are disposed on the outside of the contact element in a direction perpendicular to the first moving direction, wherein connecting lines between the guide points of the guide members are oriented perpendicular to the positioning plane and spaced apart from each other in the direction parallel to the positioning plane, wherein the guide members, in the operation of the workpiece carrier, are provided to, at least temporarily or in sections, abut on a guide of a conveyer system.

4. The workpiece carrier according to claim 1, wherein the contact element includes a first segment and a second segment which are disposed adjacent to each other and connected to each other in a direction perpendicular to the contact surface, wherein the two segments have a substantially identical shape and size, wherein the two segments are differently positioned relative to the positioning plane.

5. The workpiece carrier according to claim 4, wherein the first segment is connected to the workpiece base, and the second segment is connected to the first segment on its side located opposite of the workpiece base, wherein the contact surface is disposed on the second segment on its side located opposite of the first segment.

6. The workpiece carrier according to claim 4, wherein at least one of the guide members is disposed on the first segment and at least one of the guide members is disposed on the second segment, and/or a first aperture and a first protrusion are disposed on or in the first segment and a second aperture and a second protrusion are disposed on or in the second segment.

7. The workpiece carrier according to claim 4, wherein, in a plan view of the contact surface, the outer contour of each segment on a first side substantially corresponds to the outer contour of the segment on a second side located opposite of the first side, wherein the first side is located opposite of the second side in a direction perpendicular to the positioning plane and/or the contact element, in a perpendicular plan view of the contact surface, is formed so that it is symmetric to the positioning plane and/or, in a plan view of the contact surface, each segment is formed so that it is axially symmetric about an axis which is oriented perpendicular to the positioning plane.

8. The workpiece carrier according to claim 4, wherein, in a plan view of the contact surface, each segment is formed in a V-shape, wherein the free ends of the V respectively include a guide member on their front sides, wherein the guide members of the segments disposed adjacent to each other one above the other are flush with each other on each end of the contact element.

9. The workpiece carrier according to claim 4, wherein, in a plan view of the contact surface, each segment, at least in sections, is formed in a V-shape, wherein an aperture is disposed between the arms of the V, and a protrusion is formed by the convex outer side of the tip of the V, wherein, in a plan view of the contact surface, each segment is formed in a V-shape, wherein the tips of the V of the two segments interconnecting its two arms are disposed on opposite sides of the positioning plane, and the two segments, in a plan view, are disposed about the positioning plane so that they are symmetric to each other.

10. The workpiece carrier according to claim 4, wherein, in a plan view of the contact surface, each segment, at least in sections, is formed in a V-shape, wherein the outer surfaces of the segments, at least in sections, are designed to be planar on two sides located opposite of each other perpendicular to the positioning plane, wherein the two arms of the V are respectively oriented at an angle of 1° to 89° to the positioning plane.

11. The workpiece carrier according to claim 1, wherein a spacer element is provided which is movably connected to the workpiece holder, wherein the spacer element is laterally disposed on the workpiece holder between the receiving surface and the first segment of the contact element, and the spacer element includes at least one aperture which is incorporated in its side located opposite of the workpiece holder and which extends in a direction perpendicular to the positioning plane and parallel to the receiving surface, and at least one stopper is provided which extends in a direction perpendicular to the positioning plane and parallel to the receiving surface, wherein the stopper is mounted on the side of the workpiece holder located opposite of the spacer element in a direction perpendicular to the positioning plane and wherein the stopper, at least in sections, has a size and shape which fits into the aperture of the spacer element, wherein, in a first position of the spacer element relative to the workpiece holder, the aperture is located opposite of and flush with the stopper in a direction perpendicular to the positioning plane and, in a second position of the spacer element relative to the workpiece holder, the aperture is not located opposite of and not flush with the stopper in a direction perpendicular to the positioning plane.

12. The workpiece carrier according to claim 11, wherein the workpiece base has the shape of a cuboid, wherein either:
the spacer element has an overall length which is larger than the overall length of the workpiece holder in a direction parallel to the positioning plane so that the spacer element protrudes beyond the workpiece base in a direction parallel to the positioning plane; or
a cavity which extends through the workpiece base in a direction perpendicular to the positioning plane and which is open on the front side of the workpiece base implemented as a cuboid in the direction of the positioning plane is disposed on at least one end in the direction of the positioning plane, and the spacer element, in a view from the first moving direction, is inserted into or overlaps at least one cavity disposed on a front side of the workpiece holder, wherein the spacer element is shiftable in its position relative to the workpiece holder by inserting an object into the cavity.

13. A conveyer system for transporting workpieces and/or goods comprising:
- a conveyer element which is provided to move a plurality of workpiece carriers through the conveyer system, and wherein the conveyer element is drivable by a drive;
- a guide which confines the conveyer element on two opposite sides and which is provided to guide the workpiece carriers which are moved by conveyer element, wherein the guide determines a guide direction at any location of the conveyer element; and
- at least two workpiece carriers according to claim 1,
- wherein the contact surface of each workpiece carrier rests on the conveyer element and at least one guide member or at least one segment of a protrusion, at least temporarily, abuts on the guide.

14. The conveyer system according to claim 13, wherein the workpiece carriers are oriented parallel to the guide direction with their positioning plane, and the two guide members of a first workpiece carrier abut on the two guide members of a second workpiece carrier, or the workpiece base of a first workpiece carrier abuts on the workpiece base of a second workpiece carrier, wherein the two workpiece carriers do not overlap, wherein the two protrusions of the two workpiece carriers, at least temporarily, abut on the guide during the transport through the conveyer system and/or the workpiece carriers are oriented perpendicular to the guide direction with their positioning plane, and the workpiece carriers, in sections, overlap, wherein a protrusion of a first workpiece carrier is inserted into the aperture of a second workpiece carrier, and a protrusion of the second workpiece carrier is inserted into an aperture of the first workpiece carrier, wherein the guide members of each workpiece carrier, at least temporarily, abut on the guide during the transport through the conveyer system.

15. A method for joining a plurality of workpieces using a conveyer system according to claim 13, the method comprising the steps of:
- A) accumulating a plurality of workpiece carriers, wherein the positioning planes of the workpiece carriers are oriented perpendicular to the guide direction for the accumulation, and the workpiece carriers overlap each other, and a stopper and a spacer element of adjacent workpiece carriers contact each other or separating a plurality of workpiece carriers, wherein adjacent workpiece carriers are spaced apart from each other and the positioning planes are oriented perpendicular or parallel to the guide direction;
- B) applying a joining material, at least locally, to at least one workpiece; and
- C) pushing together the workpiece carriers, wherein the spacer elements of the workpiece carriers are adjusted so that the stoppers are flush with the apertures of the workpiece carriers so that the workpieces contact each other via the joining material and are joined thereby.

16. The workpiece carrier according to claim 1, wherein each of the apertures extends through the positioning plane.

17. The workpiece carrier according to claim 1, wherein along the first moving direction, the two apertures are longer than half the length of the entire workpiece carrier in this direction.

* * * * *